(12) United States Patent
Bae et al.

(10) Patent No.: US 11,050,264 B2
(45) Date of Patent: Jun. 29, 2021

(54) WIRELESS POWER TRANSMISSION APPARATUS

(71) Applicant: LG INNOTEK CO., LTD., Seoul (KR)

(72) Inventors: Su Ho Bae, Seoul (KR); Dong Ho Yong, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 16/667,349

(22) Filed: Oct. 29, 2019

(65) Prior Publication Data
US 2020/0067321 A1 Feb. 27, 2020

Related U.S. Application Data

(63) Continuation of application No. 16/213,542, filed on Dec. 7, 2018, now Pat. No. 10,483,769, which is a
(Continued)

(30) Foreign Application Priority Data

Sep. 30, 2014 (KR) .......................... 10-2014-0131402
Jan. 30, 2015 (KR) .......................... 10-2015-0014965

(51) Int. Cl.
*H01F 38/14* (2006.01)
*H01Q 21/30* (2006.01)
(Continued)

(52) U.S. Cl.
CPC .............. *H02J 5/005* (2013.01); *H01F 38/14* (2013.01); *H02J 7/0042* (2013.01); *H02J 7/025* (2013.01); *H02J 50/23* (2016.02)

(58) Field of Classification Search
CPC .......... H02J 5/005; H02J 50/23; H02J 7/0042; H02J 7/025; H02J 17/00; H01F 38/14
(Continued)

(56) References Cited

U.S. PATENT DOCUMENTS 9,368,274 B2   6/2016  Xu et al.
9,466,994 B2  10/2016  Yamazaki et al.
(Continued)

FOREIGN PATENT DOCUMENTS

CN   102638113 A   8/2012
CN   103999373 A   8/2014
(Continued)

OTHER PUBLICATIONS

Ahn et al., "Effect of Coupling Between Multiple Transmitters or Multiple Receivers on Wireless Power Transfer," IEEE Transactions on Industrial Electronics, vol. 60, No. 7, Jul. 2013, pp. 2602-2613.
(Continued)

*Primary Examiner* — Brandon S Cole
(74) *Attorney, Agent, or Firm* — Birch, Stewart, Kolasch & Birch, LLP

(57) ABSTRACT

A wireless power transmission apparatus can include a coil unit including a first layer including a first wireless power transmission coil having an asymmetric shape, and a second layer including a second wireless power transmission coil having an asymmetric shape, the first and second wireless power transmission coils being connected in parallel and partially overlapping with each other; and first and second terminals configured to simultaneously apply current to the first and second wireless power transmission coils connected in parallel, in which the first wireless power transmission coil and the second wireless power transmission coil have line symmetry with respect to an imaginary line extending between the first and second terminals and between the first and second layers.

14 Claims, 25 Drawing Sheets

Related U.S. Application Data continuation of application No. 14/831,685, filed on Aug. 20, 2015, now Pat. No. 10,193,352, which is a continuation of application No. 14/709,075, filed on May 11, 2015, now Pat. No. 9,450,423.

(51) Int. Cl.
*H02J 7/00* (2006.01)
*G01R 29/08* (2006.01)
*H02J 5/00* (2016.01)
*H02J 7/02* (2016.01)
*H02J 50/23* (2016.01)

(58) Field of Classification Search
USPC .................................................. 307/89–111
See application file for complete search history.

(56) References Cited

U.S. PATENT DOCUMENTS

| | | | |
|---|---|---|---|
| 10,014,104 B2 * | 7/2018 | Widmer | H01F 38/14 |
| 2007/0188287 A1 | 8/2007 | Lien et al. | |
| 2010/0276995 A1 | 11/2010 | Marzetta | |
| 2012/0169139 A1 | 7/2012 | Kudo | |
| 2012/0212069 A1 | 8/2012 | Kawano et al. | |
| 2013/0050047 A1 * | 2/2013 | Carr | H01Q 1/36 |
| | | | 343/853 |
| 2013/0154383 A1 | 6/2013 | Kasturi et al. | |
| 2013/0335018 A1 | 12/2013 | Ichikawa | |
| 2014/0028111 A1 * | 1/2014 | Hansen | A61N 1/3787 |
| | | | 307/104 |
| 2014/0084698 A1 | 3/2014 | Asanuma et al. | |
| 2014/0091640 A1 * | 4/2014 | Scholz | H04B 5/0081 |
| | | | 307/104 |
| 2014/0111019 A1 * | 4/2014 | Roy | H02J 50/60 |
| | | | 307/104 |
| 2014/0143933 A1 | 5/2014 | Low et al. | |
| 2014/0175898 A1 * | 6/2014 | Kurs | B60L 53/51 |
| | | | 307/104 |
| 2014/0176282 A1 | 6/2014 | Jung et al. | |
| 2014/0184151 A1 | 7/2014 | Han et al. | |
| 2014/0197694 A1 | 7/2014 | Asanuma et al. | |
| 2014/0300202 A1 | 10/2014 | Shimokawa | |
| 2014/0340187 A1 | 11/2014 | Werner et al. | |
| 2015/0077053 A1 * | 3/2015 | Stamenic | H02J 7/00302 |
| | | | 320/109 |
| 2015/0180548 A1 | 6/2015 | Roh et al. | |
| 2017/0063133 A1 * | 3/2017 | Sultenfuss | H02J 7/042 |

FOREIGN PATENT DOCUMENTS

| | | |
|---|---|---|
| JP | 2002-901769 A | 3/2002 |
| JP | 2008-103526 A | 5/2008 |
| JP | 2008-205216 A | 9/2008 |
| JP | 2012-135066 A | 7/2012 |
| JP | 2012-156281 A | 8/2012 |
| JP | 2012-205499 A | 10/2012 |
| JP | 2012-244763 A | 12/2012 |
| JP | 2013-140880 A | 7/2013 |
| KR | 10-1316024 B1 | 10/2013 |
| KR | 10-2014-0081356 A | 7/2014 |
| KR | 10-2014-0097615 A | 8/2014 |

OTHER PUBLICATIONS

Andrei Frumusanu, "The State of Wireless Charging Standards in Mobile" AnandTech, Apr. 2, 2015, 6 pages https://www.anandtech.com/show/9130/wireless-charging-standards-in-mobile/3.

"EPC releases A4WP-compliant high-efficiency wireless power demo Kit" PSD, Information to Power your Designs, Jul. 15, 2014, 3 pages https://www.powersystemsdesign.com/articles/epc-releases-a4wp-compliant-high-efficiency-wireless-power-demo-kit/29/7515.

* cited by examiner

Fig. 5
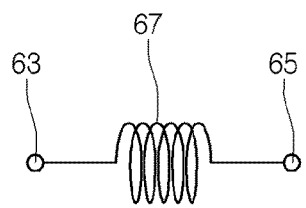
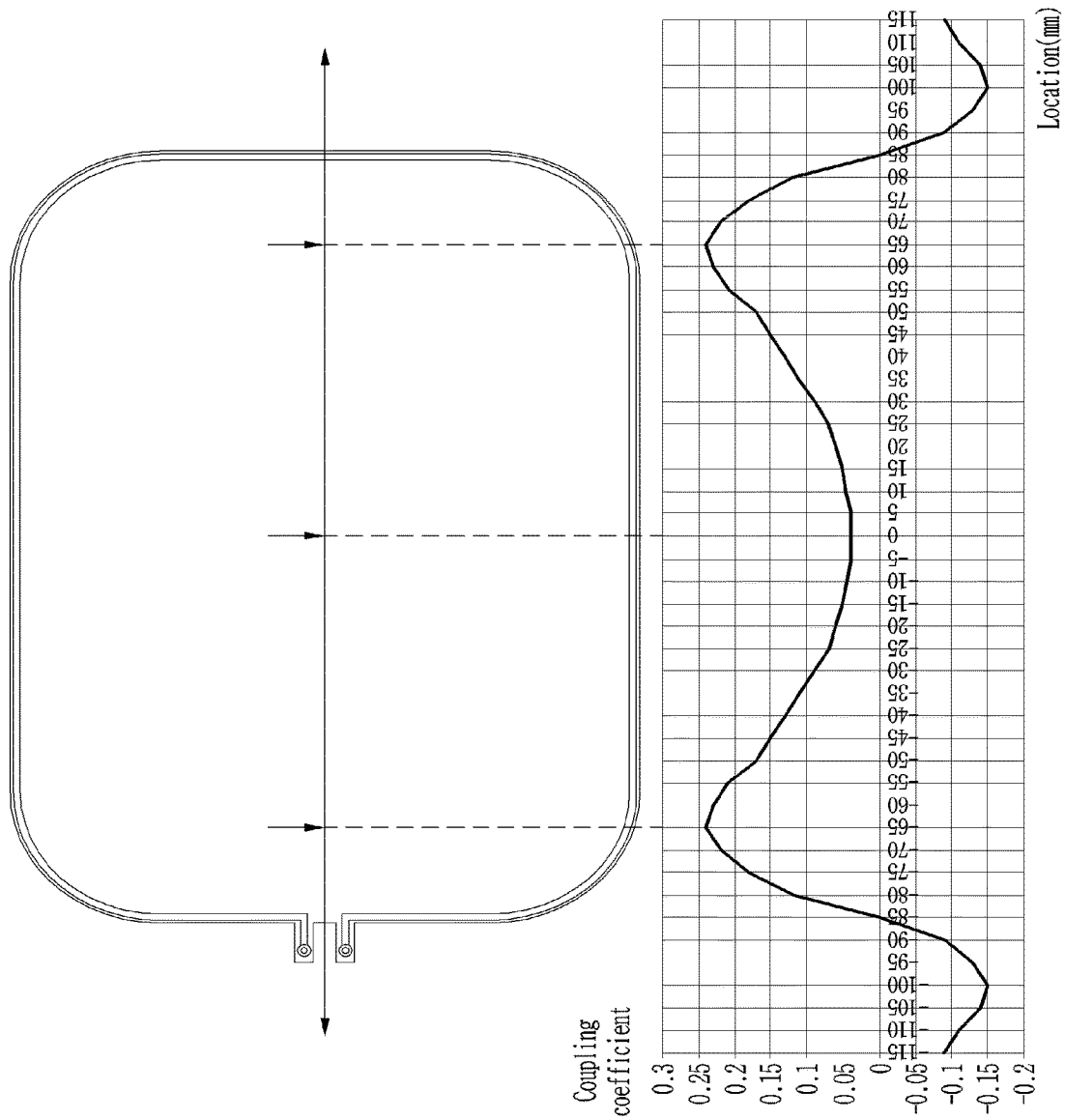

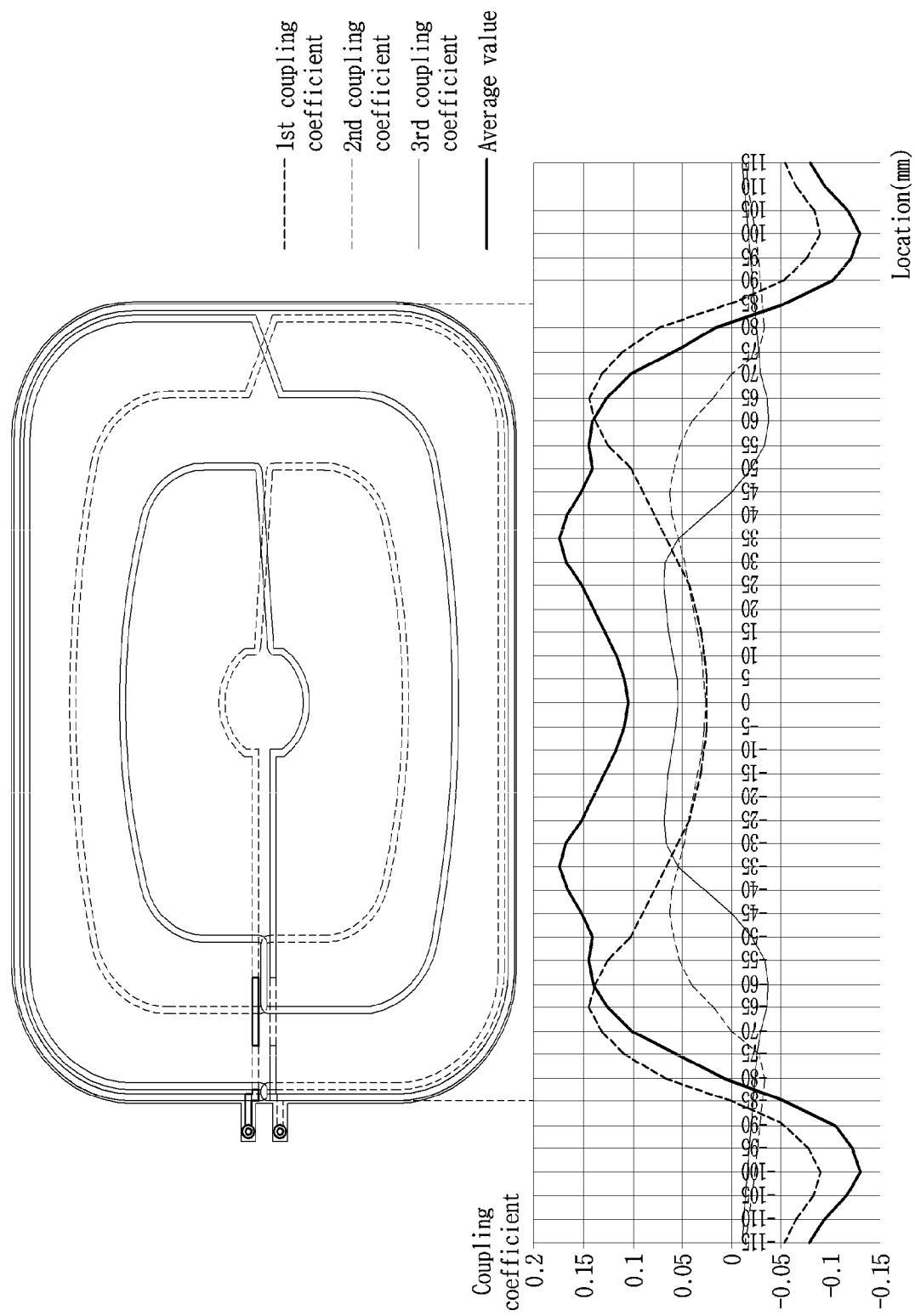

WIRELESS POWER TRANSMISSION APPARATUS

CROSS-REFERENCE TO RELATED APPLICATIONS

This application is a Continuation of co-pending U.S. patent application Ser. No. 16/213,542 filed on Dec. 7, 2018, which is a Continuation of U.S. patent application Ser. No. 14/831,685 filed on Aug. 20, 2015 (now U.S. Pat. No. 10,193,352 issued on Jan. 29, 2019), which is a Continuation of U.S. patent application Ser. No. 14/709,075 filed on May 11, 2015 (now U.S. Pat. No. 9,450,423 issued on Sep. 20, 2016), which claims the priority benefit under 35 U.S.C. § 119(a) to Korean Patent Application Nos. 10-2015-0014965 filed in the Republic of Korea on Jan. 30, 2015, and 10-2014-0131402 filed in the Republic of Korea on Sep. 30, 2014, all of which are hereby expressly incorporated by reference into the present application.

BACKGROUND OF THE INVENTION

Field of the Invention

The disclosure relates to a wireless power charging system, and more particularly to a wireless power transmission apparatus of a wireless power charging system.

Discussion of the Related Art

In general, various electronic devices are equipped with batteries and driven using power charged in the batteries. In this case, the battery is replaceable with new one, and rechargeable in the electronic device. To this end, the electronic device is equipped with a connector for the connection with an external charging device. In other words, the electronic device is electrically connected with the charging device through the connector. However, as the connector in the electronic device is exposed to the outside, the connector may be contaminated with foreign matters or shorted by moisture. In this case, connection failure occurs between the connector and the charging device, so that the battery in the electronic device may not be charged with power.

In order to solve the above problem, there has been suggested a wireless power charging system to wirelessly charge the electronic device with power. The wireless power charging system includes a wireless power transmission apparatus and a wireless power reception apparatus. The wireless power transmission apparatus wirelessly transmits power and the wireless power reception apparatus wirelessly receives power. The electronic device may include the wireless power reception apparatus, or may be electrically connected with the wireless power reception apparatus. In this case, the wireless power reception apparatus must be arranged within a preset charging area of the wireless power transmission apparatus. In particular, when the wireless power charging system is realized through a resonance scheme, it is important that the wireless power transmission apparatus is designed to have a constant coupling coefficient regardless of the location of the wireless power reception apparatus. Otherwise, the variation range of a transmission power amount to be adjusted in the wireless power transmission apparatus must be increased according to the locations of the wireless power reception apparatus. Accordingly, the realization cost of the wireless power charging system may be increased and the efficiency of the wireless power charging system may be degraded.

SUMMARY OF THE INVENTION

The disclosure provides a wireless power transmission apparatus having more improved power transmission efficiency. More particularly, the disclosure provides a wireless power transmission apparatus having a chargeable area more enlarged as the wireless power transmission apparatus has a constant coupling coefficient according to locations.

In order to accomplish the above object of the disclosure, there is provided a wireless power transmission apparatus including a mounting member, an upper transmission coil on the mounting member, a lower transmission coil under the mounting member, a first terminal connected with an outer connection part of the upper transmission coil and an inner connection part of the lower transmission coil, and a second terminal connected with an inner connection part of the upper transmission coil and an outer connection part of the lower transmission coil. The upper transmission coil and the lower transmission coil are bilaterally symmetrical to each other about a central axis between the first and second terminals.

According to the wireless power transmission apparatus of the disclosure, as a plurality of transmission coils are formed symmetrically to each other, magnetic fields formed by the transmission coils have vertical and horizontal symmetrical shapes. Accordingly, the coupling coefficient between the wireless power transmission apparatus and the wireless power reception apparatus can be constant according to the locations of the wireless power transmission apparatus. Accordingly, the variation range of a transmission power amount to be adjusted in the wireless power transmission apparatus can be reduced, so that the realization cost of the wireless power charging system can be reduced and the efficiency of the wireless power charging system can be improved.

BRIEF DESCRIPTION OF THE DRAWINGS

FIG. 5 is a circuit diagram showing an equivalent circuit of the typical wireless transmission unit;

FIG. 6 is a graph to explain a coupling coefficient of a typical wireless reception unit;

FIG. 19 is a graph to explain a coupling coefficient of a wireless transmission unit according to the third embodiment of the disclosure.

DETAILED DESCRIPTION OF THE EMBODIMENTS

Figure 1:
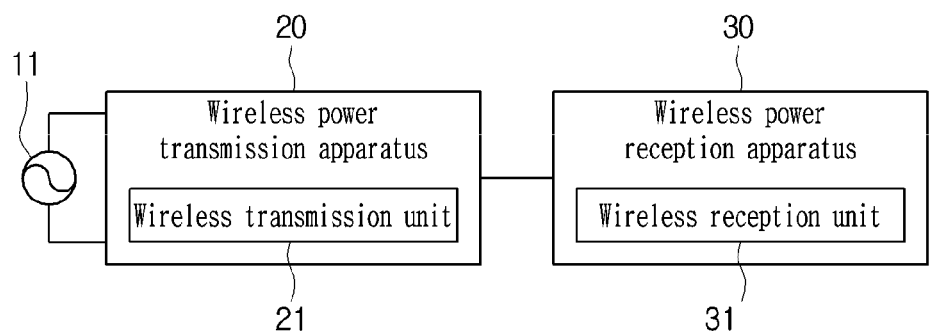
FIG. 1 is a block diagram showing a typical wireless power charging system.

Hereinafter, embodiments of the disclosure will be more described with reference to accompanying drawings. In this case, it is noted that the same reference numerals are assigned to the same elements as much as possible. In addition, the details of well known functions or configurations that may make the subject matter of the embodiments unclear will be omitted in the following description.

FIG. 1 is a block diagram showing a typical wireless power charging system, and FIGS. 2a, 2b, 2c, 2d, and 2e are circuit diagrams showing equivalent circuits of a wireless transmission unit and a wireless reception unit showing in FIG. 1.

Referring to FIG. 1, a typical wireless power charging system 10 includes a wireless power transmission apparatus 20 and a wireless power reception apparatus 30.

The wireless power transmission apparatus 20 is connected with a power supply 11 to receive power from the power supply 11. In addition, the wireless power transmission apparatus 20 wirelessly transmits power. In this case, the wireless power transmission apparatus 20 may transmit AC power. In this case, the wireless power transmission apparatus 20 transmits the power through various charging schemes. The charging schemes include an electromagnetic induction scheme, a resonance scheme, and an RF/micro wave radiation scheme. In other words, at least one of the charging schemes is preset to the wireless power transmission apparatus 20. In addition, the wireless power transmission apparatus 20 may transmit power through the preset charging scheme. The wireless power transmission apparatus 20 includes a wireless transmission unit 21.

The wireless power reception apparatus 30 wirelessly receives power. In this case, the wireless power reception apparatus 30 may receive AC power. In addition, the wireless power reception apparatus may convert the AC power into DC power. In this case, the wireless power reception apparatus 30 receives power through various charging schemes. The charging schemes include an electromagnetic induction scheme, a resonance scheme, and an RF/micro wave radiation scheme. In other words, at least one of the charging schemes is preset to the wireless power reception apparatus 30. In addition, the wireless power reception apparatus 30 may receive power the preset charging scheme. In addition, the wireless power reception apparatus 30 may be driven using power. The wireless power reception apparatus 30 includes a wireless reception unit 31.

In this case, in order for the wireless power transmission apparatus 20 to transmit power to the wireless power reception apparatus 30, the charging scheme of the wireless power transmission apparatus 20 is identical to that of the wireless power reception apparatus 30.

Figure 2A:
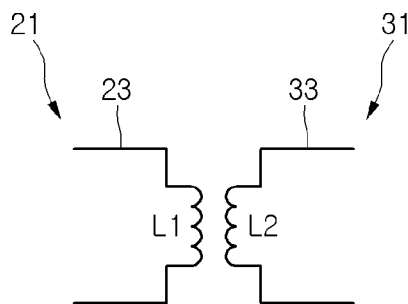
FIGS. 2a, 2b, 2c, 2d, and 2e are circuit diagrams showing equivalent circuits of a wireless transmission unit and a wireless reception unit of FIG. 1.

For example, when the wireless power transmission apparatus 20 and the wireless power reception apparatus 30 employ the electromagnetic induction scheme as the charging scheme thereof, the wireless transmission unit 21 and the wireless reception unit 31 may be expressed as the circuit shown in FIG. 2a. The wireless transmission unit 21 may include a transmission induction coil 23. In this case, the transmission induction coil 23 may be represented as a transmission inductor L1, and the wireless reception unit 31 may include a reception induction coil 33. In this case, the reception induction coil 33 may be represented as a reception inductor L2. Accordingly, when the reception induction coil 33 is provided in opposition to the transmission induction coil 23, the transmission induction coil 23 may transmit power to the reception induction coil 33 through the electromagnetic induction scheme.

Meanwhile, when the wireless power transmission apparatus 20 and the wireless power reception apparatus 30 employ the resonance scheme as the charging scheme thereof, the wireless transmission unit 21 and the wireless reception unit 31 may be expressed as the circuits shown in FIGS. 2b, 2c, 2d, and 2e.

Figure 2B:
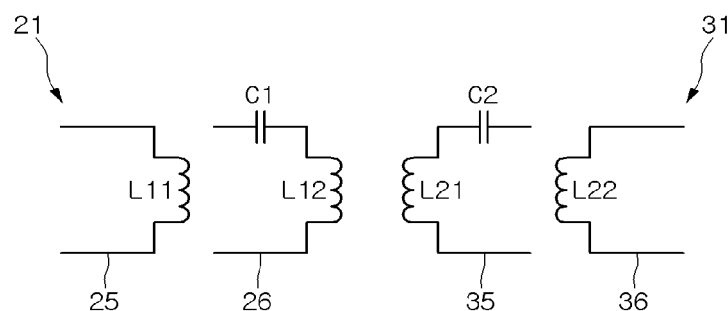
Figure 2C:
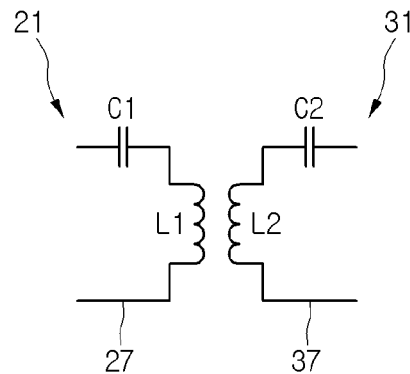
Figure 2D:
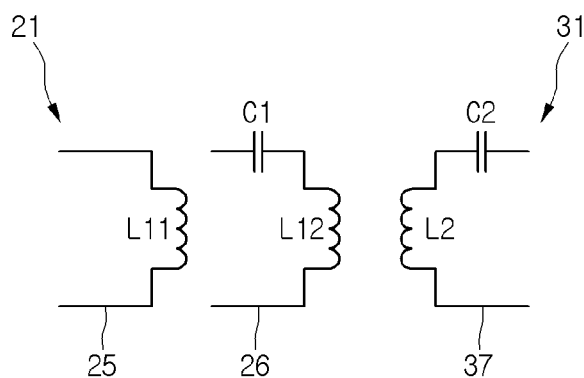
Figure 2E:
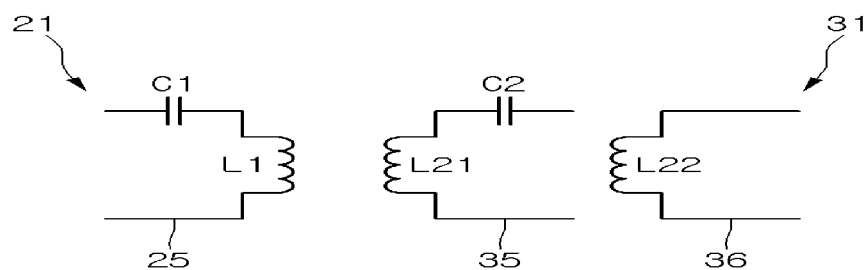

The wireless transmission unit 21 may include a transmission induction coil 25 and a transmission resonance coil 26 as shown in FIGS. 2b and 2d. In this case, the transmission induction coil 25 may be provided in opposition to the transmission resonance coil 26. In addition, the transmission induction coil 25 may be represented as a first transmission inductor L11. In addition, the transmission resonance coil 26 may be represented as a second transmission inductor L2 and a transmission capacitor C1. In this case, the second transmission inductor L2 and the transmission capacitor C1 may be connected with each other in parallel to form a closed loop. In addition, the wireless transmission unit 21 may include a transmission resonance coil 27 as shown in FIGS. 2c and 2e. In this case, the transmission resonance coil 27 may be represented as the transmission inductor L1 and the transmission capacitor C1. In this case, the transmission inductor L1 and the transmission capacitor C1 may be connected with each other in serial.

In addition, the wireless reception unit 31 may include a reception resonance coil 35 and a reception induction coil 36 as shown in FIGS. 2b and 2e. In this case, the reception resonance coil 35 and the reception induction coil 36 may be provided in opposition to each other. In addition, the reception resonance coil 35 may be represented as a reception capacitor C2 and a first reception inductor L21. In this case, the reception capacitor C2 and the first reception inductor L21 may be connected with each other in parallel to form a closed loop. The reception induction coil 36 may be represented as a second reception inductor L22. In addition, the wireless reception unit 31 may include a reception resonance coil 37 as shown in FIGS. 2c and 2d. In this case, the reception resonance coil 37 may be represented as the reception inductor L2 and the reception capacitor C2. In this case, the reception inductor L2 and the reception capacitor C2 may be connected with each other in serial.

Accordingly, when the reception resonance coil 35 is provided in opposition to the transmission resonance coil 26, the transmission resonance coil 26 may transmit power to the reception resonance coil 35 through the resonance scheme. In this case, the transmission induction coil 25 may transmit power to the transmission resonance coil 26 through the electromagnetic induction scheme, and the transmission resonance coil 26 may transmit power to the reception resonance coil 35 through the resonance scheme. In addition, the transmission resonance coil 26 may directly transmit power to the reception resonance coil 35 through the resonance scheme. In addition, the reception resonance coil 35 may receive power from the transmission resonance coil 26 through the resonance scheme, and the reception induction coil 36 may receive power from the reception resonance coil 35 through the electromagnetic induction scheme. In addition, the reception resonance coil 35 may receive power from the transmission resonance coil 26 through the resonance scheme.

A quality factor and a coupling coefficient are important in the wireless power charging system 10. In this case, as the quality factor and the coupling coefficient have a larger value, the efficiency of the wireless power charging system 10 is improved.

The quality factor may refer to an index of energy that may be stored in the vicinity of the wireless power transmission apparatus 20 or the wireless power reception apparatus 30. The quality factor may vary according to the operating frequency (w), the shape, the size, and the material of the transmission coil 23, 25, 26, or 27 of the wireless transmission unit 21, or the reception coil 33, 35, 36, or 37 of the wireless reception unit 31. The quality factor may be calculated an equation of $Q=\omega*L/R$. In the above equation, L refers to the inductance of the transmission coil 23, 25, 26, or 27 or the reception coil 33, 35, 36, or 37 and R refers to resistance corresponding to the quantity of power loss caused in the transmission coil 23, 25, 26, or 27 or the reception coil 33, 35, 36, or 37. The quality factor may have a value of 0 to infinity.

The coupling coefficient represents the degree of magnetic coupling between the wireless power transmission apparatus 20 and the wireless power reception apparatus 30. In this case, the coupling coefficient may be determined depending on the relative position and the distance between the transmission coil 23, 25, 26, or 27 of the wireless power transmission apparatus 21 and the reception coil 33, 35, 36, or 37. The coupling coefficient has a value ranging from 0 to 1.

Figure 3:
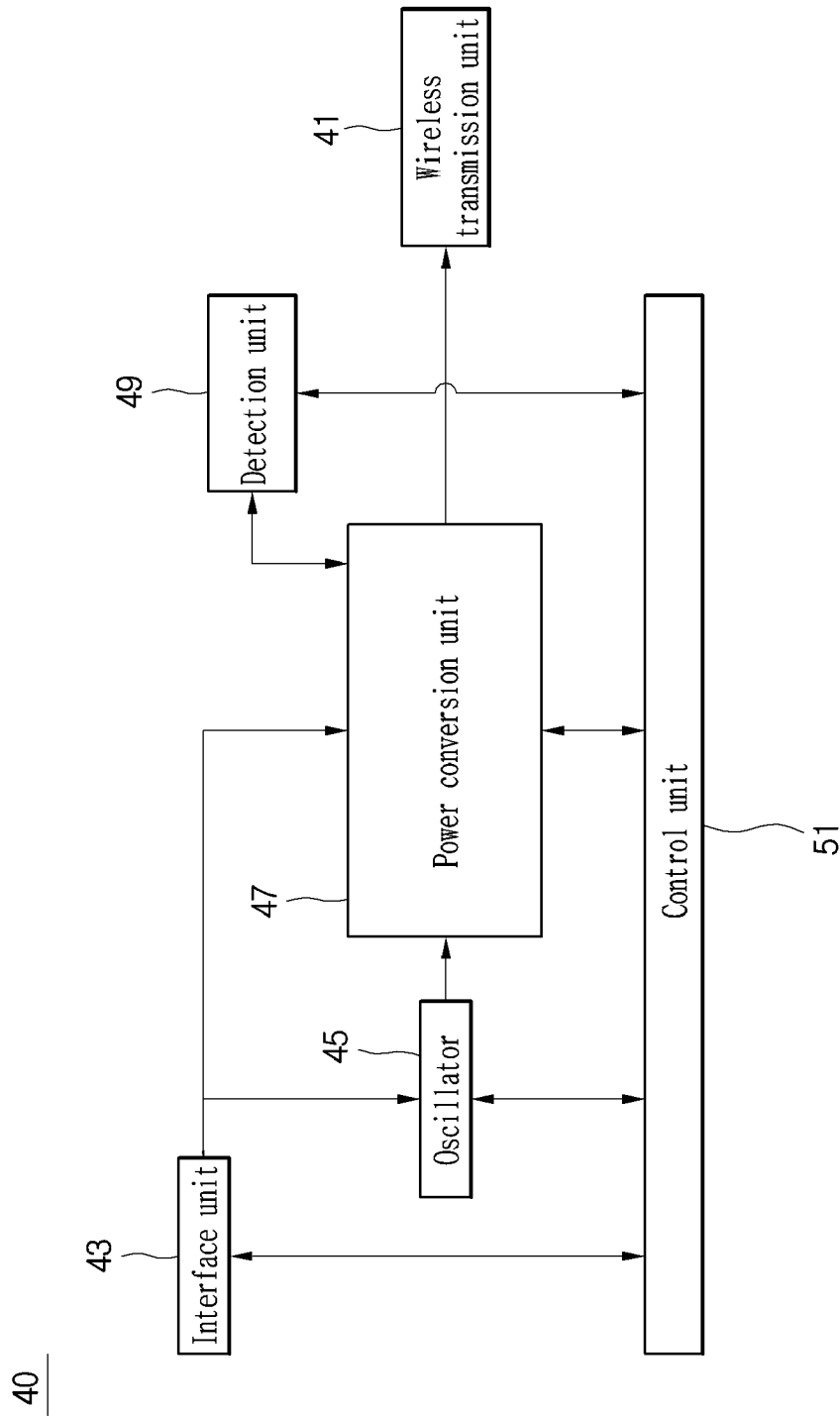
FIG. 3 is a block diagram showing a typical wireless power transmission apparatus.

FIG. 3 is a block diagram showing a typical wireless power transmission apparatus.

Referring to FIG. 3, a typical wireless power transmission apparatus 40 includes a wireless transmission unit 41, an interface unit 43, an oscillator 45, a power conversion unit 47, a detection unit 49, and a control unit 51.

The wireless transmission unit 41 wirelessly transmits power in the wireless power transmission apparatus 40. In this case, the wireless transmission unit 41 transmits power through multiple charging schemes. In this case, the charging schemes include an electromagnetic induction scheme, a resonance scheme, and an RF/micro wave radiation scheme. The wireless transmission unit 41 may include at least one transmission coil. In this case, the transmission coil may include at least one of a transmission induction coil and a transmission resonance coil according to the charging scheme of the transmission coil.

The interface unit 43 provides an interface with the power supply 11 in the wireless power transmission apparatus 40. In other words, the interface unit 43 is connected with the power supply 11. In this case, the interface unit 43 may be connected with the power supply 11 through a wired scheme. In addition, the interface unit 43 receives power from the power supply 11. The interface unit 43 receives DC power from the power supply 11.

The oscillator 45 generates an AC signal. In this case, the oscillator 45 generates the AC signal corresponding to the charging scheme of the wireless transmission unit 41. In this case, the oscillator 45 generates the AC signal to have a predetermined frequency.

The power conversion unit 47 converts power to be provided for the wireless transmission unit 41. In this case, the power control unit 51 receives DC power from the interface unit 43 and receives the AC signal from the oscillator 45. In addition, the power conversion unit 47 generates AC power using the DC power and the AC signal. In this case, the power conversion unit 47 may amplify the AC signal for the use of the AC signal. In addition, the power conversion unit 47 outputs the AC power to the wireless transmission unit 41. The power conversion unit 47 may have a push-pull type structure. In the push-pull type structure, paired switches, paired transistors, or paired predetermined circuit blocks are alternately operated and alternately output a response.

The detection unit 49 detects a power transmission state of the wireless power transmission apparatus. In this case, the detection unit 49 may detect the intensity of current between the power conversion unit 47 and the wireless transmission unit 41. In this case, the detection unit 49 may detect the intensity of current at an output terminal of the power conversion unit 47 or an input terminal of the wireless transmission unit 41. The detection unit 49 may include a current sensor. In this case, the current sensor may include a current transformer (CT).

The control unit 51 controls the whole operations of the wireless power transmission apparatus 40. The control unit 51 operates the wireless transmission unit 41 to wirelessly transmit power. In this case, the control unit 51 controls the power conversion unit 47 to supply power to the wireless transmission unit 41. To this end, the control unit 51 operates the wireless transmission unit 41 to determine the existence of the wireless power reception apparatus 30 (FIG. 1). In this case, the control unit 51 controls the detection unit 49 to determine the existence of the wireless power reception apparatus 30. In other words, the control unit 51 determines the existence of the wireless power reception apparatus 30 according to the power transmission state of the wireless power transmission apparatus 40. If the wireless power reception apparatus 30 exists, the control unit 51 operates the wireless transmission unit 41 to wirelessly transmit power.

In this case, as the wireless power transmission apparatus 40 approaches the wireless power reception apparatus 30, the intensity of current detected by the detection unit 49 may be increased, which represents that the coupling coefficient between the wireless power transmission apparatus and the wireless power reception apparatus is a high value. Meanwhile, as the wireless power transmission apparatus 40 is gradually spaced apart from the wireless power reception apparatus 30, the intensity of current detected by the detection unit 49 may be decreased, which represents that the coupling coefficient between the wireless power transmission apparatus and the wireless power reception apparatus is a low value.

Figure 4:
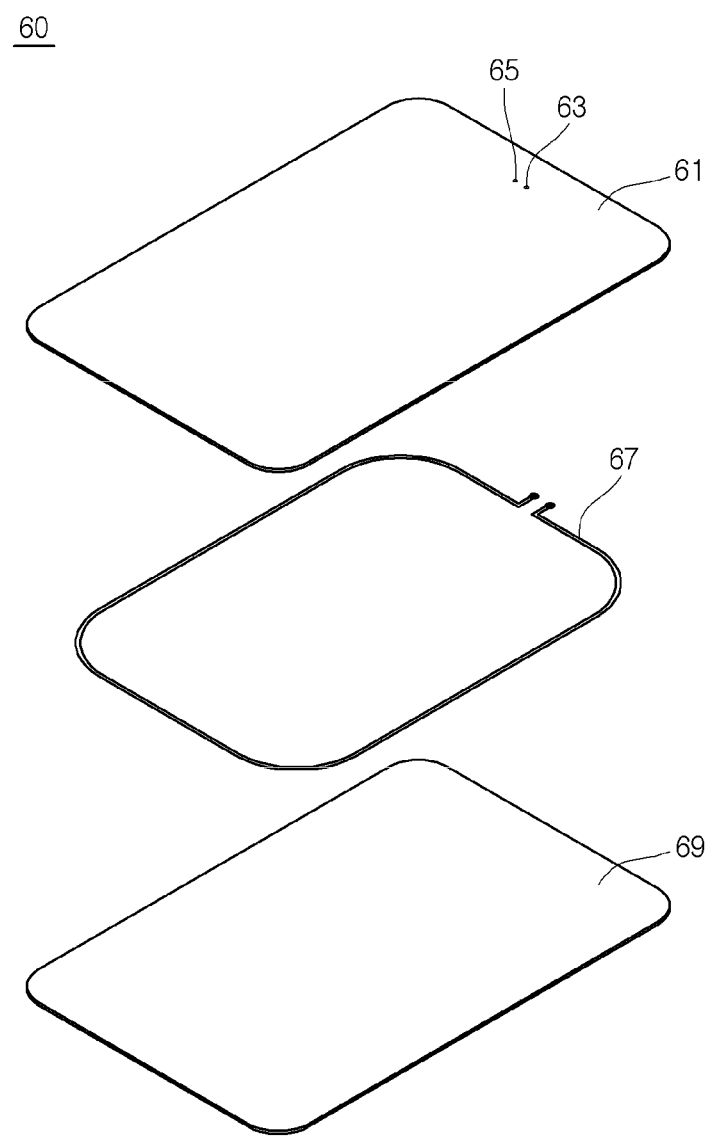
FIG. 4 is an exploded perspective view showing a typically wireless transmission unit.

FIG. 4 is an exploded perspective view showing a typically wireless transmission unit, FIG. 5 is a circuit diagram showing an equivalent circuit of the typical wireless transmission unit, and FIG. 6 is a graph to explain a coupling coefficient of a typical wireless reception unit.

Referring to FIG. 4, a typical wireless transmission unit 60 includes a mounting member 61, a first terminal 63, a second terminal 65, a transmission coil 67, and a shielding member 69. In this case, the wireless transmission unit 60 transmits power through the resonance scheme.

The mounting member 61 supports the first terminal 63, the second terminal 65, and the transmission coil 67. In this case, the mounting member 61 may be formed at a single layer structure, or may be formed at a multi-layer structure. The mounting member 61 includes a printed circuit board (PCB), a flexible PCB (FPCB), or a film.

The first terminal 63 and the second terminal 65 alternately apply current to the transmission coil 67. In addition, the first and second terminals 63 and 65 alternately output current from the transmission coil 67. For example, when the first terminal 63 applies current to the transmission coil 67, the second terminal 65 outputs current from the transmission coil 67. Meanwhile, when the second terminal 65 applies current to the transmission coil 67, the first terminal 63 outputs current from the transmission coil 67. In this case, the first and second terminals 63 and 65 may be connected with the power conversion unit 47 (FIG. 3).

The first and second terminals 63 and 65 are mounted on the mounting member 61. In this case, the first and second terminals 63 and 65 are arranged on one surface of the mounting member 61. In other words, the first and second terminals 63 and 65 are arranged on a top surface or a bottom surface of the mounting member 61. In addition, the first and second terminals 63 and 65 may include a conductive material.

The transmission coil 67 transmits power according to a preset charging scheme. The charging scheme includes an electromagnetic induction scheme, a resonance scheme or an RF/micro wave radiation scheme. In this case, the transmission coil 67 operates at a predetermined resonance frequency band to transmit power. In this case, if current is transmitted along the transmission coil 67, an electromagnetic field may be formed around the transmission coil 67.

The transmission coil 67 is mounted on the mounting member 67. In this case, the transmission coil 67 is provided on one surface of the mounting member 61. In other words, the transmission coil 67 is arranged on a top surface or a bottom surface of the mounting member 61. In this case, the transmission coil 67 is formed in one-turn. For example, the transmission coil 67 may be formed in a circular shape or a rectangular shape. In addition, the transmission coil 67 is connected with the first and second terminals 63 and 65 at both end portions thereof. In this case, the transmission coil 67 may be represented as one inductor as shown in FIG. 5. In addition, the transmission coil 67 may include a conductive material. In addition, the transmission coil 67 may include a conductive material and an insulating material, and the conductive material may be coated with the insulating material.

The shielding member 69 isolates the transmission coil 67. In other words, the shielding member 69 isolates the transmission coil 67 from other components of the wireless power transmission apparatus 40 (see FIG. 3). In this case, the shielding member 69 has a predetermined physical property. In this case, the physical property includes permeability (p). The permeability of the shielding member 69 may be maintained at a resonance frequency band of the transmission coil 67. Accordingly, the loss rate of the shielding member 69 may be reduced at the resonance frequency band of the transmission coil 67.

In general, the coupling coefficient between the wireless transmission unit 60 and the wireless reception unit 31 (see FIG. 1) is not a constant according to the locations as shown in FIG. 6. In other words, the coupling coefficient between the wireless transmission unit 60 and the wireless reception unit 31 is increased toward a wire of the transmission coil 67. This is because the intensity of a magnetic field is increased toward the wire of the transmission coil 67. Accordingly, the coupling coefficient between the wireless transmission unit 60 and the wireless reception unit 31 has a low value at a location corresponding to the center of the transmission coil 67. Therefore, a chargeable area of the wireless transmission unit 60 is narrow.

Figure 7:
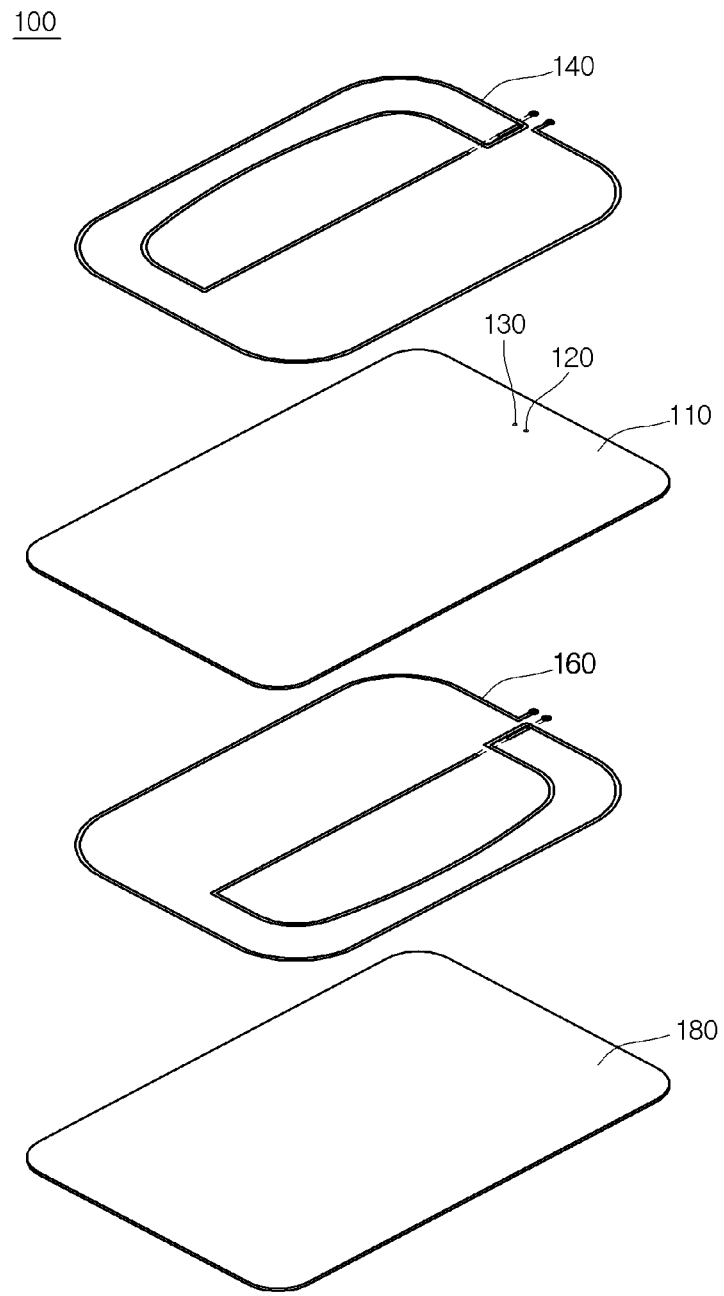
FIG. 7 is an exploded perspective view showing a wireless transmission unit according to a first embodiment of the disclosure.
Figure 8A:
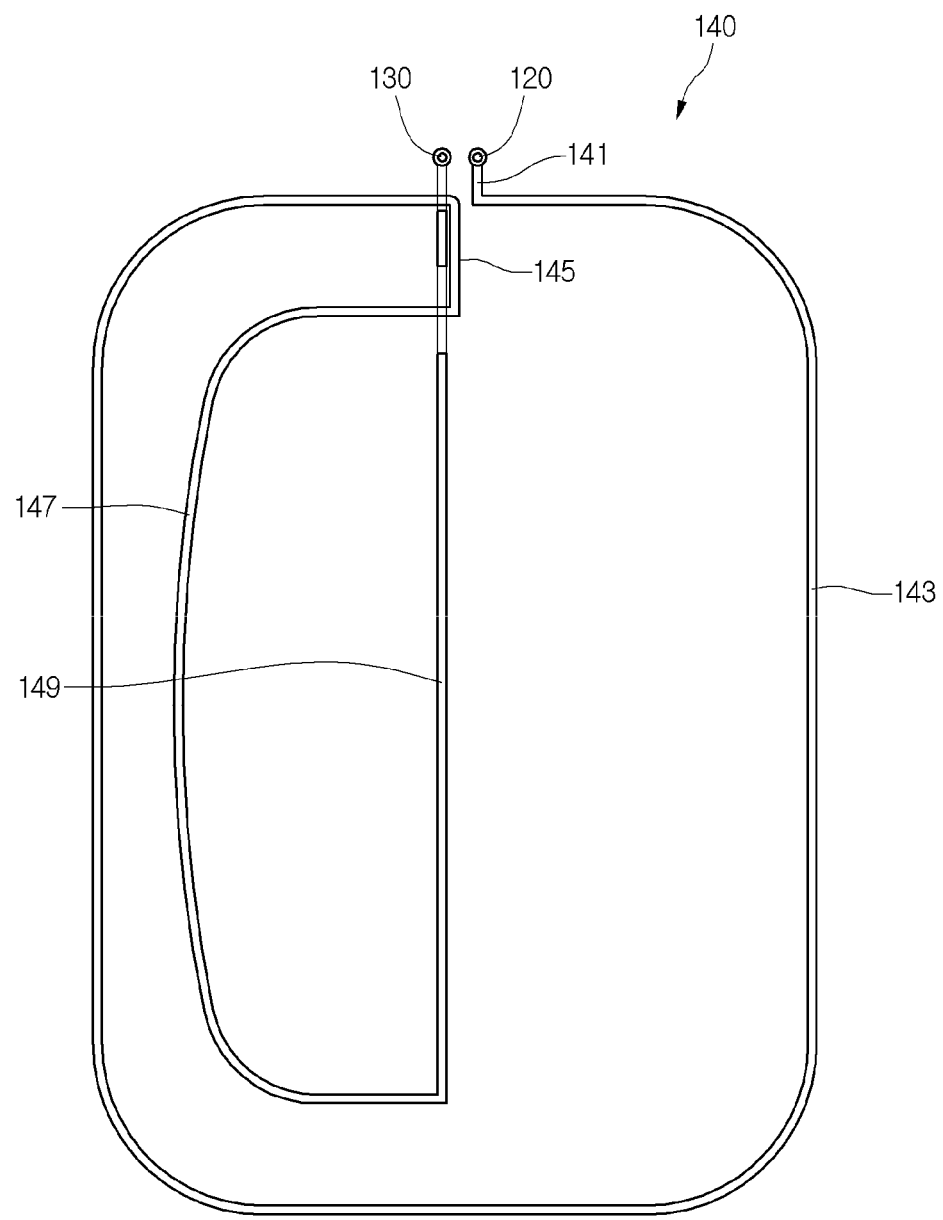
FIGS. 8a and 8b are plan views showing an upper transmission coil of FIG. 7.
Figure 8B:
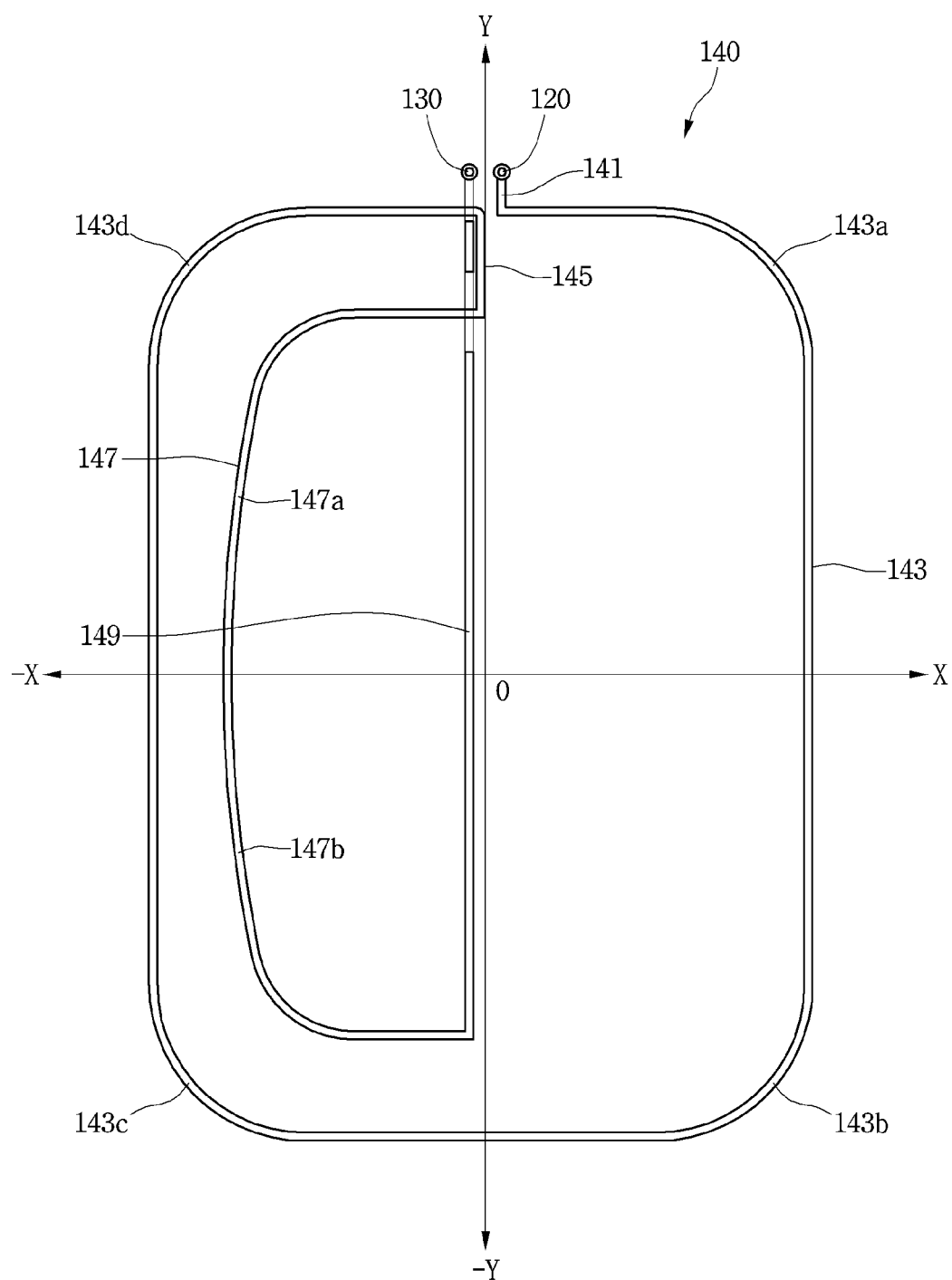
Figure 9A:
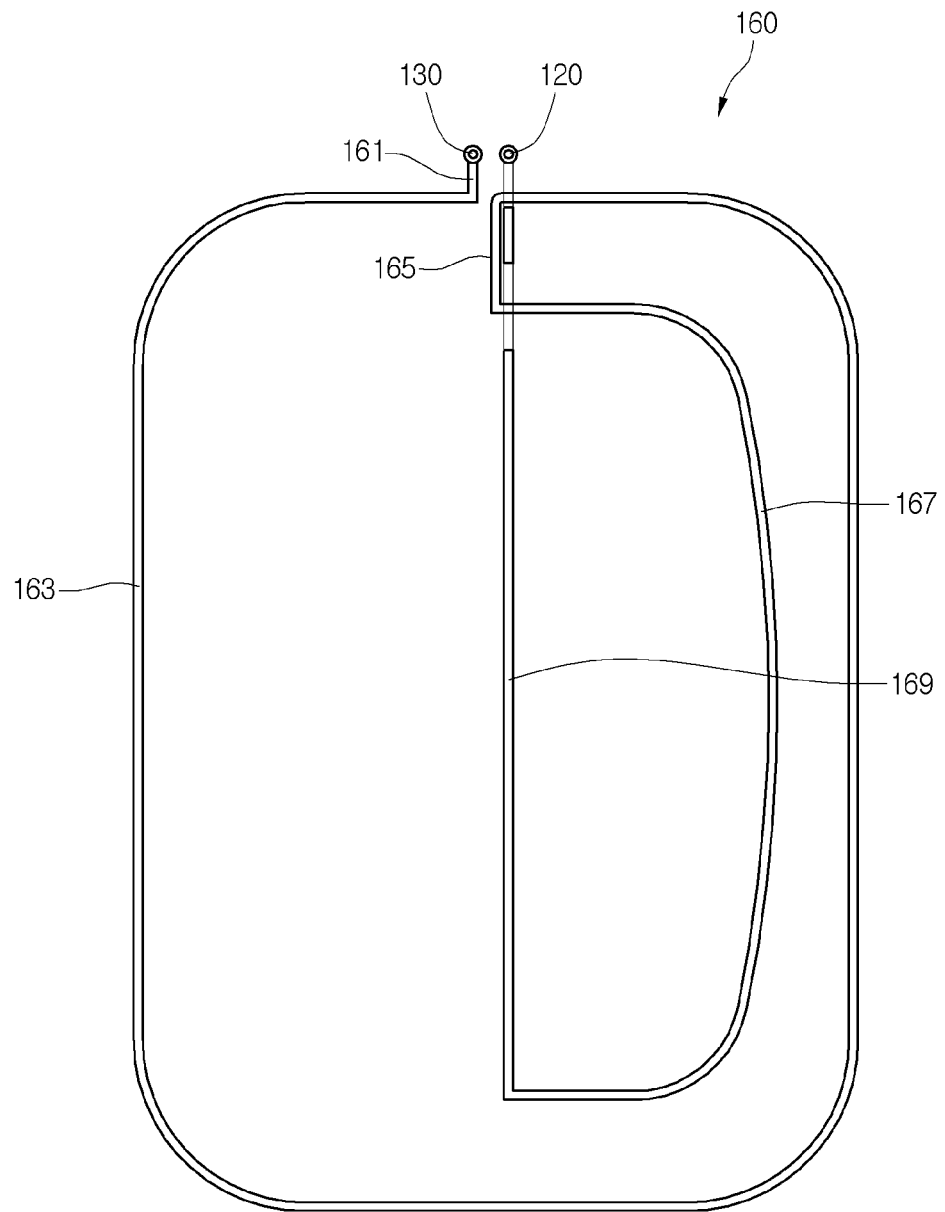
FIGS. 9a and 9b are plan views showing a lower transmission coil of FIG. 7.
Figure 9B:
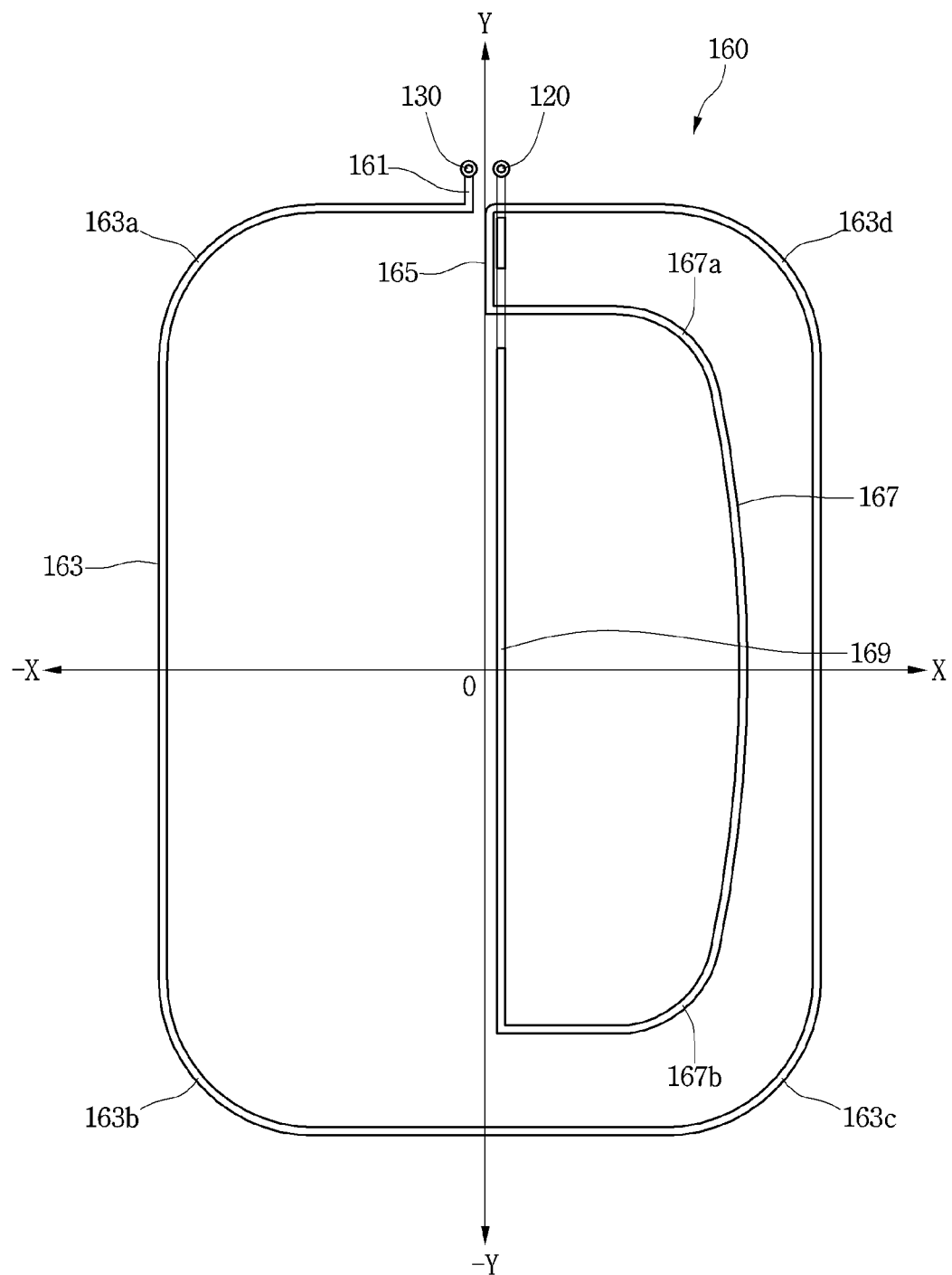
Figure 10:
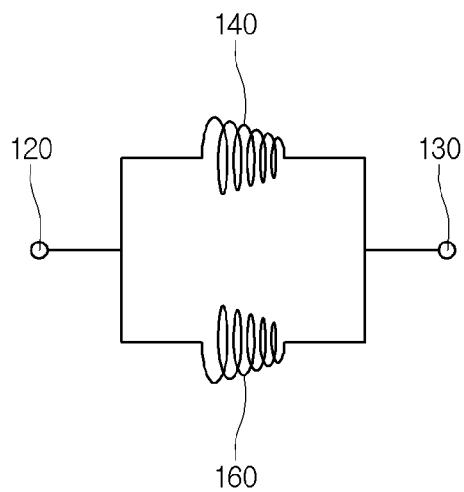
FIG. 10 is a circuit diagram showing an equivalent circuit of the wireless transmission unit according to the first embodiment of the disclosure.
Figure 11:
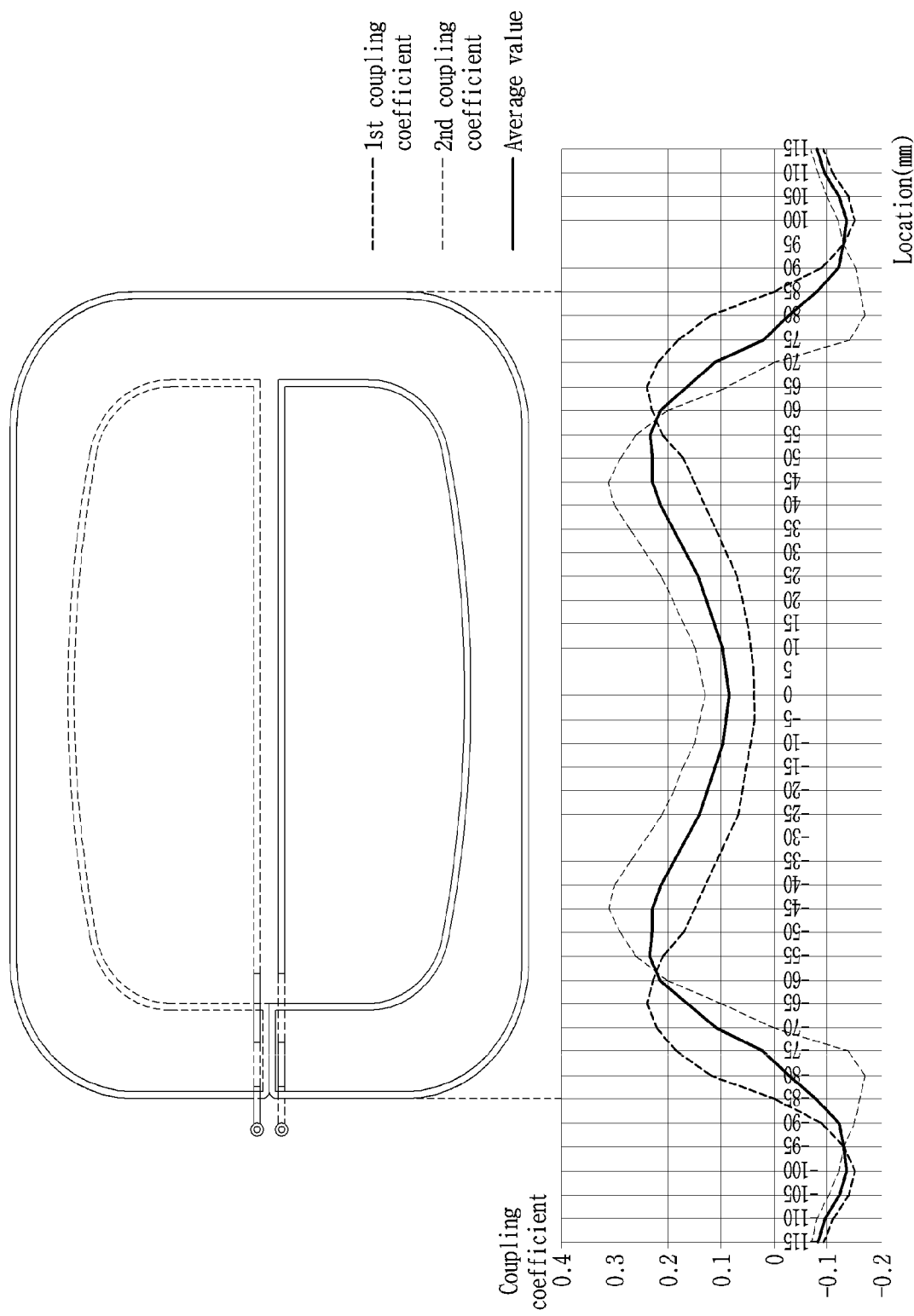
FIG. 11 is a graph to explain a coupling coefficient of the wireless transmission unit according to the first embodiment of the disclosure.

FIG. 7 is an exploded perspective view showing a wireless transmission unit according to a first embodiment of the disclosure. FIGS. 8a and 8b are plan views showing an upper transmission coil of FIG. 7. FIGS. 9a and 9b are plan views showing a lower transmission coil of FIG. 7. FIG. 10 is a circuit diagram showing an equivalent circuit of the wireless transmission unit according to the first embodiment of the disclosure. In addition, FIG. 11 is a graph to explain a coupling coefficient of the wireless transmission unit according to the first embodiment of the disclosure.

Referring to FIGS. 7, 8a, 8b, 9a, and 9b, a wireless transmission unit 100 according to the present embodiment includes a mounting member 110, a first terminal 120, a second terminal 130, an upper transmission coil 140, a lower transmission coil 160, and a shielding member 180. In this case, the wireless transmission unit 100 transmits power through a resonance scheme.

The mounting member 110 supports the first and second terminals 120 and 130 and the upper and lower transmission coils 140 and 160. In this case, the mounting member 100 may be formed at a single layer structure or may be formed at a multi-layer structure. In addition, the mounting member 110 may include a PCB, an FPCB, or a film.

The first and second terminals 120 and 130 alternately apply current to the upper and lower transmission coils 140 and 160. In addition, the first and second terminals 120 and 130 alternately output current from the upper and lower transmission coils 140 and 160. For example, when the first terminal 120 applies current to the upper and lower transmission coils 140 and 160, the second terminal 130 outputs current from the upper and lower transmission coils 140 and 160. On the contrary, when the second terminal 130 applies current to the upper and lower transmission coils 140 and 160, the first terminal 120 outputs current from the upper and lower transmission coils 140 and 160. In this case, the first and second terminals 120 and 130 may be connected with an output terminal of the power conversion unit 47 (see FIG. 3).

The first and second terminals 120 and 130 are mounted on the mounting member 110. In this case, the first and second terminals 120 and 130 are arranged on one surface of the mounting member 110. In other words, the first and second terminals 120 and 130 are arranged on a top surface or a bottom surface of the mounting member 110. The first and second terminals 120 and 130 are withdrawn from an opposite surface of the mounting member 110. In other words, the first and second terminals 120 and 130 are withdrawn from the top surface or the bottom surface of the mounting member 110. In this case, the first terminal 120 includes a first terminal via (not shown) formed through the mounting member 110, and may be withdrawn through the first terminal via. In addition, the second terminal 130 includes a second terminal via (not shown) formed through the mounting member 110, and may be withdrawn through the second terminal via. In addition, the first and second terminals 120 and 130 may include a conductive material. In this case, a Y axis serves as a central axis passing between the first and second terminals 120 and 130. In this case, the interval between the Y axis serving as the central axis and the first terminal 120 may be equal to the interval between the central axis and the second terminal 130. In other words, when a perpendicular is drawn from the first terminal 120 onto the Y axis, the distance between the first terminal 120 and the foot of the perpendicular may be equal to the distance between the second terminal 130 and the foot of a virtual perpendicular when the virtual perpendicular is drawn from the second terminal 130 onto the Y axis.

In addition, an X axis may be defined perpendicularly to the Y axis. In this case, on the assumption that an intersection point between the Y and X axes is zero, the Y axis may be divided into a positive Y (Y) axis and a negative Y (−Y) axis based on the 0 point, and the X axis may be divided into a positive X (X) axis and a negative X (−X) axis. In addition, the zero point serving as the intersection point may be defined as a central point. In other words, when the upper and lower transmission coils 140 and 160 are mounted on the mounting member 110, the zero point may serve as the central point of the upper and lower transmission coils 140 and 160 in terms of a position. In addition, a first quadrant may be defined by the Y axis and the X axis, a second quadrant may be defined by the −Y axis and the X axis, a third quadrant may be defined by the −Y axis and the −X axis, and a fourth quadrant may be defined by the Y axis and the −X axis. In this case, the first terminal 120 may be provided in the first quadrant, and the second terminal 130 may be provided in the fourth quadrant.

The upper and lower transmission coils 140 and 160 transmit power according to a preset charging scheme. In this case, the upper and lower transmission coils 140 and 160 are mutually coupled to each other to transmit power. In other words, the upper and lower transmission coils 140 and 160 transmit power in cooperation with each other. In this case, the charging scheme includes an electromagnetic induction scheme, a resonance scheme, and an RF/micro wave radiation scheme. In addition, the upper and lower transmission coils 140 and 160 may be coupled to each other through the electromagnetic induction scheme. In addition, the upper and lower transmission coils 140 and 160 operate at a predetermined resonance frequency band to transmit power. In this case, when the upper and lower transmission coils 140 and 160 operate, the electromagnetic field may be formed around the upper and lower transmission coils 140 and 160.

The upper and lower transmission coils 140 and 160 are mounted on the mounting member 110. In this case, the upper transmission coil 140 is arranged on one surface of the mounting member 110, and the lower transmission coil 160 is arranged on an opposite surface of the mounting member 110. In other words, the upper transmission coil 140 is provided on the top surface of the mounting member 110, and the lower transmission coil 160 is provided on the bottom surface of the mounting member 110.

In addition, the upper and lower transmission coils 140 and 160 are connected with the first and second terminals 120 and 130, respectively. In other words, the upper transmission coil 140 is connected with the first and second terminals 120 and 130 at both end portions thereof, and the lower transmission coil 160 is connected with the first and second terminals 120 and 130 at both end portions thereof.

In addition, the upper and lower transmission coils 140 and 160 have a bilaterally symmetrical shape about the Y axis serving as the central axis. In this case, the upper and lower transmission coils 140 and 160 may have the shape shown in FIG. 10. In other words, the upper and lower transmission coils 140 and 160 may be represented as inductors connected with each other in parallel.

In addition, the upper and lower transmission coils 140 and 160 may include conductive materials. In addition, the upper and lower transmission coils 140 and 160 may include a conductive material and an insulating material, and the conductive material may be coated with the insulating material.

The upper transmission coil 140 includes an outer connection part 141, an outer coil part 143, an extension part 145, an inner coil part 147, and an inner connection part 149.

The outer connection part 141 is connected with the first terminal 120. In this case, the outer connection part 141 extends from the first terminal 120. For example, when the first terminal 120 is provided at the right side of the Y axis, the outer connection part 141 may extend at the right side of the Y axis serving as the central axis. In other words, the outer connection part 141 starts from the first terminal 120 and extends in the negative Y (−Y) axis direction by a predetermined length in parallel to the Y axis. In this case, the predetermined length is a length corresponding to an extent that the outer connection part 141 may be provided only at the first quadrant without extending to the second quadrant.

The outer coil part 143 is provided at the outermost part of the upper transmission coil 140. In addition, the outer coil part 143 is connected with the outer connection part 141. In this case, the outer coil part 143 extends from the outer connection part 141. The outer coil part 143 is formed in one-turn. For reference, the one-turn represents that a coil extends in a circular shape or a rectangular shape. For example, when the first terminal 120 is provided at the right side of the Y axis serving as the central axis, the outer coil part 143 may extend from the outer connection part 141 clockwise. In addition, the outer coil part 143 may extend from the right side of the Y axis serving as the central axis to the left side of the Y axis serving as the central axis. In detail, the outer coil part 143 may include a first outer coil part 143*a* provided at the first quadrant, a second outer coil part 143*b* provided at the second quadrant, the third outer coil part 143*c* provided at the third quadrant, and the fourth outer coil part 143*d* provided at the fourth quadrant, and the first to fourth outer coil parts 143*a* to 143*d* are integrated with each other. The first outer coil part 143*a* may extend to an intersection between the first outer coil part 143*a* and the X axis from a terminated point of the outer connection part 141. In other words, the first outer coil part 143*a* extends in parallel to the X axis in the positive X (X) axis direction from the terminated point of the outer connection part 141. Then, the first outer coil part 143*a* extends in parallel to the Y axis in the negative Y (−Y) axis direction. When the direction of the first outer coil part 143*a* is changed from the negative Y (−Y) axis direction from the positive X (X) axis direction, the direction of the first outer coil part 143*a* may be changed with a predetermined curvature. In addition, the second outer coil part 143*b* may extend from the terminated point of the first outer coil part 143*a* to the intersection between the second outer coil part 143*b* and the Y axis. In other words, the second outer coil part 143*b* extends in parallel to the Y axis in the negative Y (−Y) axis direction from the terminated point of the first outer coil part 143*a*, and extends in parallel to the X axis in the negative X (−X)

axis direction. When the direction of the second outer coil part 143b is changed from the negative Y (−Y) axis direction to the negative X (−X) axis direction, the direction of the second outer coil part 143b may be changed with a predetermined curvature. In addition, the third outer coil part 143c may extend from the terminated point of the second outer coil part 143b to the intersection between the third outer coil part 143c and the X axis. In other words, the third outer coil part 143c extends in parallel to the X axis in the negative X (−X) axis direction from the terminated point of the second outer coil part 143b, and extends in parallel to the Y axis in the positive Y (Y) axis direction. When the direction of the third outer coil part 143c is changed from the negative X (−X) axis direction to the positive Y (Y) axis direction, the direction of the third outer coil part 143c may be changed with a predetermined curvature. In addition, the fourth outer coil part 143d may extend from the terminated point of the third outer coil part 143c to the intersection between the fourth outer coil part 143d and the Y axis. In other words, the fourth outer coil part 143d extends in parallel to the Y axis in the positive Y (Y) axis direction from the terminated point of the third outer coil part 143c, and extends in parallel to the X axis in the positive X (X) axis direction. When the direction of the fourth outer coil part 143d is changed from the positive Y (Y) axis direction to the positive X (X) axis direction, the direction of the fourth outer coil part 143d may be changed with a predetermined curvature In addition, the first outer coil part 143a and the second outer coil part 143b are symmetrical to each other about the X axis, the first outer coil part 143a and the fourth outer coil part 143d are symmetrical to each other about the Y axis, and the first outer coil part 143a and third outer coil part 143c are symmetrical to each other about a origin (0).

Meanwhile, although description has been made regarding that the first to fourth outer coil parts 143a, 143b, 143c, and 143d partially have a linear shape and partially have a curved shape with a curvature, the embodiment is not limited thereto. In other words, the whole shape of the first to fourth outer coil parts 143a, 143b, 143c, and 143d may have an oval shape or a circular shape. Accordingly, when the first outer coil part 143a extends in the positive X (X) axis direction, the distance between the first outer coil part 143a and the X axis may be gradually decreased. When the first outer coil part 143a extends in the negative Y (−Y) axis direction, the distance between the first outer coil part 143a and the Y axis may be gradually increased. In addition, when the second outer coil part 143b extends in the negative Y (−Y) axis direction, the distance between the second outer coil part 143b and the Y axis may be gradually decreased. When the second outer coil part 143b extends in the negative X (−X) axis direction, the distance between the second outer coil part 143b and the X axis may be gradually increased. In addition, when the third outer coil part 143c extends in the negative X (−X) axis direction, the distance between the third outer coil part 143c and the X axis may be gradually decreased. When the third outer coil part 143c extends in the negative Y (−Y) axis direction, the distance between the third outer coil part 143c and the Y axis may be gradually increased. In addition, when the fourth outer coil part 143d extends in the positive Y (Y) axis direction, the distance between the fourth outer coil part 143d and the Y axis may be gradually decreased. When the fourth outer coil part 143d extends in the positive X (X) axis direction, the distance between the fourth outer coil part 143d and the X axis may be gradually increased. Accordingly, the whole shape of the outer coil part 143 may have a circular shape or an oval shape.

The extension part 145 is connected with the outer coil part 143. In this case, the extension part 145 extends from a terminated point of the fourth outer coil part 143d. The extension part 145 extends inward of the outer coil part 143. For example, when the first terminal 120 is provided at the right side of the Y axis serving as the central axis, the extension part 145 may extend from the left side of the Y axis serving as the central axis in parallel to the Y axis in the negative Y (−Y) axis direction by a predetermined length. The predetermined length may be a length corresponding to an extent that the extension part 145 may be provided only at the fourth quadrant without extending to the third quadrant.

The inner coil part 147 extends from a terminated point of the extension part 145. In addition, the inner coil part 147 is connected with the extension part 145. In this case, the inner coil part 147 is provided inward of the outer coil part 143. In other words, the inner coil part 147 has a radius less than that of the outer coil part 143. In this case, the inner coil part 147 is formed in a half-turn. For reference, the half-turn represents that a coil extends at any one of left and right sides of a central axis in a circular shape or a rectangular shape. For example, when the first terminal 120 is provided at the right side of the central axis, the inner coil part 147 may extend from the extension part 145 counterclockwise. In addition, the inner coil part 147 may extend at the left side of the Y axis serving as the central axis. In detail, the inner coil part 147 may include a first inner coil part 147a provided at the fourth quadrant and a second inner coil part 147b provided at the third quadrant in which the first and second inner coil parts 147a and 147b are integrated with each other. In addition, the first inner coil part 147a extends from a terminated point of the extension part 145 in the negative X (−X) axis direction, and extends in the negative Y (−Y) axis direction until the first inner coil part 147a meets the X axis. When the direction of the first inner coil part 147a is changed from the negative X (−X) axis direction to the negative Y (−Y) axis direction, the direction of the first inner coil part 147a may be changed with a predetermined curvature. In addition, the second inner coil part 147b extends from a terminated point of the first inner coil part 147a in the negative Y (−Y) axis direction, and extends in the positive X (X) axis direction in the third quadrant. When the direction of the second inner coil part 147b is changed from the negative Y (−Y) axis direction to the positive X (X) axis direction, the direction of the second inner coil part 147b may be changed with a predetermined curvature. Meanwhile, although description has been made regarding that the first and second inner coil parts 147a and 147b partially have a linear shape and partially have a curved shape with a curvature, the embodiment is not limited thereto. In other words, the whole shape of the first and second inner coil parts 147a and 147b may have an oval shape or a rectangular shape. Accordingly, when the first inner coil part 147a extends in the negative X (−X) axis direction, the distance between the first inner coil part 147a and the X axis may be constant or gradually decreased. When the first inner coil part 147a extends in the negative Y (−Y) axis direction, the distance between the first inner coil part 147a and the Y axis may be constant or may be gradually increased. In addition, when the second inner coil part 147b extends in the negative Y (−Y) axis direction, the distance between the second inner coil part 147b and the Y axis may be constant or gradually decreased. When the second inner coil part 147b extends in the positive X (X)

axis direction, the distance between the second inner coil part 147*b* and the X axis may be constant or may be gradually increased.

Meanwhile, the first inner coil part 147*a* may be symmetrical to the second inner coil part 147*b* about the X axis.

The inner connection part 149 is connected with the inner coil part 147. In addition, the inner connection part 149 is connected with the second terminal 130. In this case, the inner connection part 149 extends from the inner coil part 147 to the second terminal 130. For example, when the second terminal 130 is provided at the left side of the Y axis serving as the central axis, the inner connection part 149 may extend at the right side of the central axis. In detail, the inner connection part 149 extends in parallel to the Y axis in the positive Y (Y) axis direction from a terminated point of the second inner coil part 147*b*, so that the inner connection part 149 may be connected with the second terminal 130, and may be provided at the third quadrant and fourth quadrant. In addition, the inner connection part 149 may include at least one connection via (not shown) formed through the mounting member 110. In other words, the inner connection part 149 may be connected with the second terminal 130 by passing the bottom surface of the mounting member 110 through the connection via, so that the inner connection part 149 does not make contact with the lower transmission coil 160.

Meanwhile, the lower transmission coil 160 includes an outer connection part 161, an outer coil part 163, an extension part 165, an inner coil part 167, and an outer connection part 169.

The outer connection part 161 is connected with the second terminal 130. The outer connection part 161 extends from the second terminal 130. For example, when the second terminal 130 is provided at the left side of the central axis, the outer connection part 161 may extend at the left side of the central axis.

The outer coil part 163 is provided at the outermost part of the lower transmission coil 160. In addition, the outer coil part 163 is connected with the outer connection part 161. In this case, the outer coil part 163 extends from the outer connection part 161. In this case, the outer coil part 163 is formed in one-turn. For example, when the second terminal 130 is provided at the left side of the central axis, the outer coil part 163 may extend counterclockwise from the outer connection part 161. In addition, the outer coil part 163 may extend from the left side of the central axis to the right side of the central axis.

The extension part 165 is connected with the outer coil part 163. In this case, the extension part 165 extends from the outer coil part 163. In this case, the extension part 165 extends inward of the outer coil part 163. For example, when the second terminal 130 is provided at the left side of the central axis, the extension part 165 may extend at the right side of the central axis.

The inner coil part 167 extends from the extension part 165. In addition, the inner coil part 167 is connected with the extension part 165. In this case, the inner coil part 167 is provided inward of the outer coil part 163. In other words, the inner coil part 167 has a radius less than that of the outer coil part 163. In this case, the inner coil part 167 is formed in a half-turn. For example, when the second terminal 130 is provided at the left side of the central axis, the inner coil part 167 may extend clockwise from the extension part 165. In addition, the inner coil part 167 may extend at the right side of the central axis.

The inner connection part 169 is connected with the inner coil part 167. In addition, the inner connection part 169 is connected with the first terminal 120. In this case, the inner connection part 169 extends from the inner coil part 167 to the first terminal 120. For example, when the first terminal 120 is provided at the right side of the central axis, the inner connection part 169 may extend at the right side of the central axis. In addition, the inner connection part 169 may include at least one connection via (not shown) passing through the mounting member 110. In other words, the inner connection part 169 may be connected with the first terminal 120 by passing the top surface of the mounting member 110 through the connection via so that the inner connection part 169 does not make contact with the upper transmission coil 140.

In addition, the upper transmission coil 140 has the same current application direction as that of the lower transmission coil 160. For example, when the current application direction of the upper transmission coil 140 is a clockwise direction, the current application direction of the lower transmission coil 160 is a clockwise direction. Meanwhile, when current is transmitted inward through the upper transmission coil 140, current is transmitted outward through the lower transmission coil 160. For example, when current is transmitted to the first terminal 120, current may be inward transmitted through the upper transmission coil 140, and transmitted outward through the lower transmission coil 160. In addition, when current is transmitted outward through the upper transmission coil 140, current is inward transmitted through the lower transmission coil 160. For example, when current is transmitted to the second terminal 130, current may be transmitted outward through the upper transmission coil 140, and current may be transmitted inward through the lower transmission coil 160.

In other words, the outer coil part 143 of the upper transmission coil 140 vertically faces the outer coil part 163 of the lower transmission coil 160. In addition, the outer connection part 141, the extension part 145, the inner coil part 147, and the inner connection part 149 of the upper transmission coil 140 are provided in opposition to the outer connection part 161, the extension part 165, the inner coil part 167, and the inner connection part 169 of the lower transmission coil 160, respectively, about the central axis. Accordingly, the upper and lower transmission coils 140 and 160 have a bilaterally symmetrical shape about the central axis.

Hereinafter, the bilaterally symmetrical shape of the upper and lower transmission coils 140 and 160 will be described in detail. Since the extension part 165 of the lower transmission coil 160 is provided at the first quadrant, the extension part 165 of the lower transmission coil 160 may be symmetrical to the extension part 145 of the upper transmission coil 140 about the Y axis. In addition, the outer coil part 163 of the lower transmission coil 160 may include a first outer coil part 163*a* provided at the fourth quadrant, a second outer coil part 163*b* provided at the third quadrant, a third outer coil part 163*c* provided at the second quadrant, and the fourth outer coil part 163*d* provided at the first quadrant. The first outer coil part 163*a* of the lower transmission coil 160 may be symmetrical to the first outer coil part 143*a* of the upper transmission coil 140 about the Y axis. The second outer coil part 163*b* of the lower transmission coil 160 may be symmetrical to the second outer coil part 143*b* of the upper transmission coil 140 about the Y axis. The third outer coil part 163*c* of the lower transmission coil 160 may be symmetrical to the third outer coil part 143*c* of the upper transmission coil 140 about the Y axis. The fourth outer coil part 163*d* of the lower transmission coil 160 may be symmetrical to the fourth outer coil part 143*d* of the upper transmission coil 140 about the Y axis. In addition, the inner coil part 167 of the lower transmission coil 160 may include a first inner coil part 167a provided at the first quadrant and a second inner coil part 167b provided at the second quadrant. The first inner coil part 167a of the lower transmission coil 160 may be symmetrical to the first inner coil part 147a of the upper transmission coil 140 about the Y axis, and the second inner coil part 167b of the lower transmission coil 160 may be symmetrical to the second inner coil part 147b of the upper transmission coil 140 about the Y axis. An inner connection part 169 of the lower transmission coil 160 may be symmetrical to the inner connection part 149 of the upper transmission coil 140 about the Y axis, so that the inner connection part 169 of the lower transmission coil 160 may be provided at the second quadrant or the first quadrant.

The distance between the outer coil part 143 and the inner coil part 147 of the upper transmission coil 140 and the distance between the outer coil part 163 and the inner coil part 167 of the lower transmission coil 160 may be formed corresponding to ½ of the size of the reception coil. In addition, the distance between the outer coil part 143 and the inner coil part 147 of the upper transmission coil 140 may be formed to the extent that a position where the coupling coefficient between the outer coil part 143 of the upper transmission coil 140 and the reception coil becomes maximized is matched with a position where the coupling coefficient between the inner coil part 147 and the reception coil becomes zero. Similarly, the distance between the outer coil part 163 and the inner coil part 167 of the lower transmission coil 160 may be formed to the extent that a position where the coupling coefficient between the outer coil part 163 of the lower transmission coil 160 and the reception coil becomes maximized is matched with a position where the coupling coefficient between the inner coil part 167 and the reception coil becomes zero.

The shielding member 180 isolates the upper transmission coil 140 from the lower transmission coil 160. In other words, the shielding member 180 isolates the upper and lower transmission coils 140 and 160 from other components of the wireless power transmission apparatus 40 (see FIG. 3). In this case, the shielding member 180 has a predetermined physical property. In this case, the physical property includes permeability (p). The permeability of the shielding member 180 may be maintained at a resonance frequency band of the upper and lower transmission coils 140 and 160. Accordingly, the loss rate of the shielding member 180 may be reduced at the resonance frequency band of the upper and lower transmission coils 140 and 160.

The shielding member 180 supports the mounting member 110, the first terminal 120, the second terminal 130, the upper transmission coil 140, and the lower transmission coil 160. In addition, the shielding member 180 is formed of ferrite. In other words, the shielding member 180 may include metallic powders and a resin material. For example, the metallic powders may include soft magnetic metal powders, aluminum (Al), metal silicon, or an iron oxide (FeO; $Fe_3O_4$; $Fe_2O_3$). In addition, the resin material may include thermoplastic resin, for example polyolefin elastomer.

According to the present embodiment, the coupling coefficient between the wireless transmission unit 100 and the wireless reception unit 31 (see FIG. 1) is substantially constant according to locations as shown in FIG. 11. The coupling coefficient between the wireless transmission unit 100 and the wireless reception unit 31 is formed equally to an average value of a first coupling coefficient formed between the outer coil part 143 of the upper transmission coil 140 and the outer coil part 163 of the lower transmission coil 160 and a second coupling coefficient formed between the inner coil part 147 of the upper transmission coil 140 and the inner coil part 167 of the lower transmission coil 160. Accordingly, the coupling coefficient between the wireless transmission unit 100 and the wireless reception unit 31 has a higher value even if the wireless reception unit 31 approaches the centers of the upper and lower transmission coils 140 and 160. Accordingly, the chargeable area of the wireless transmission unit 100 is enlarged.

Figure 12:
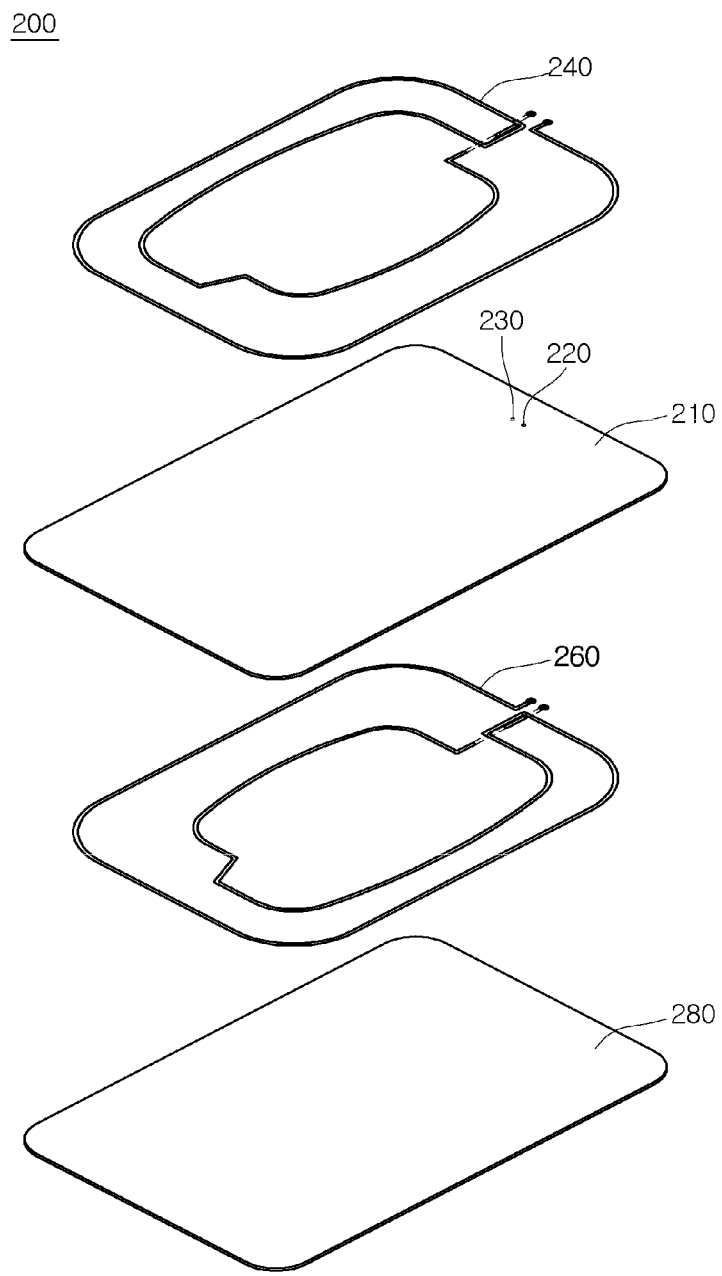
FIG. 12 is an exploded perspective view showing a wireless transmission unit according to a second embodiment of the disclosure.
Figure 13A:
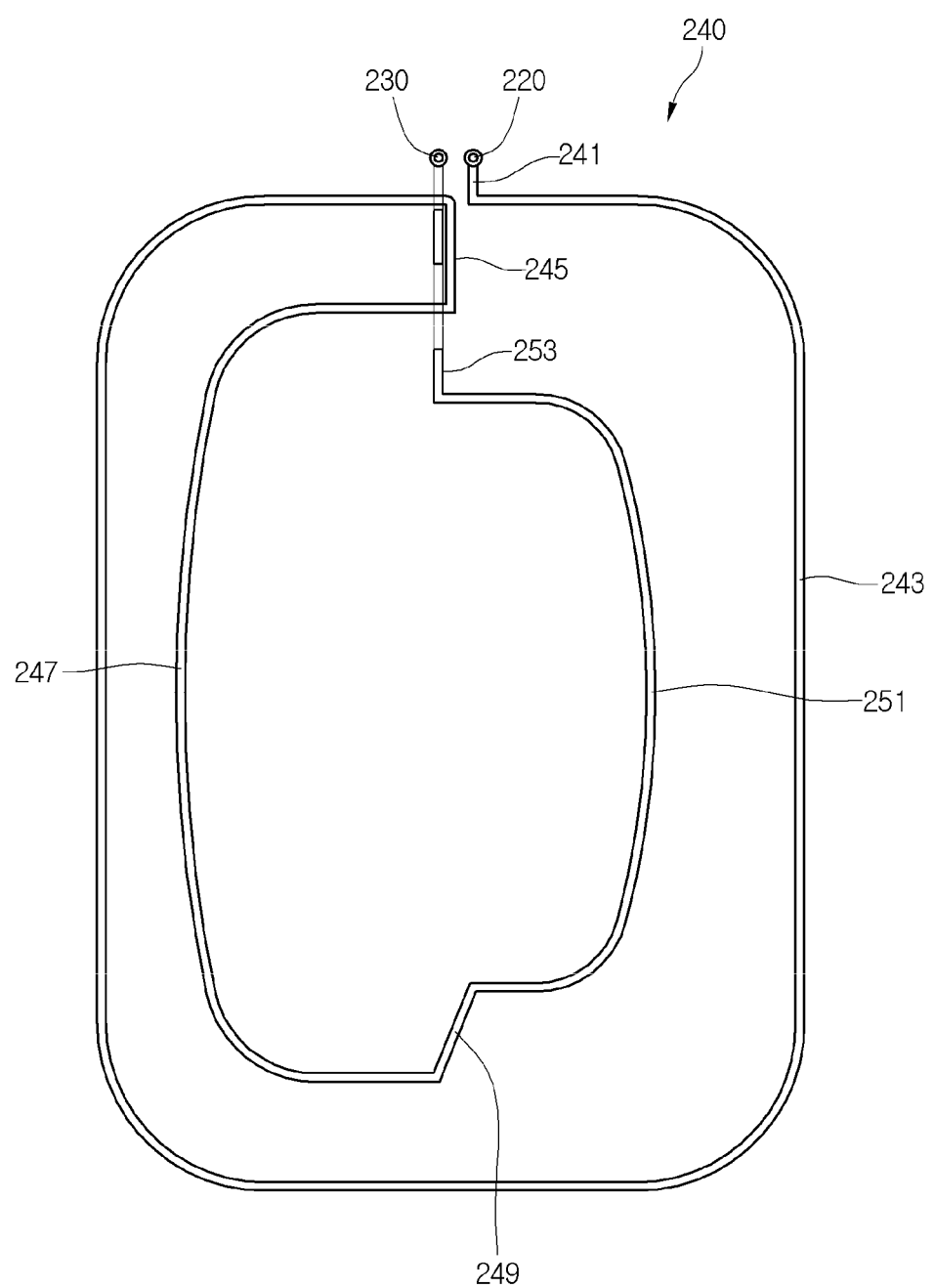
FIGS. 13a and 13b are plan views showing an upper transmission coil of FIG. 12.
Figure 13B:
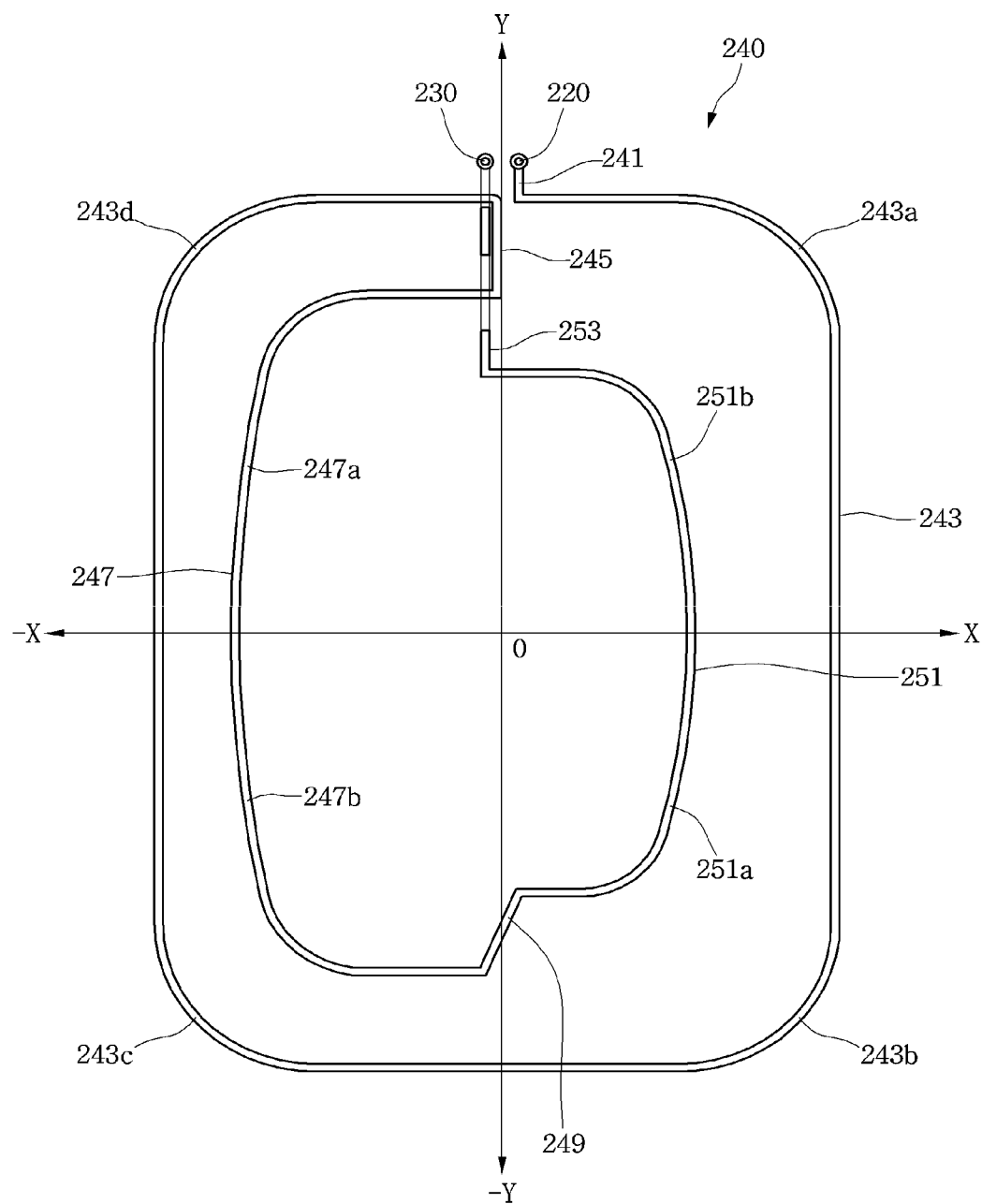
Figure 14A:
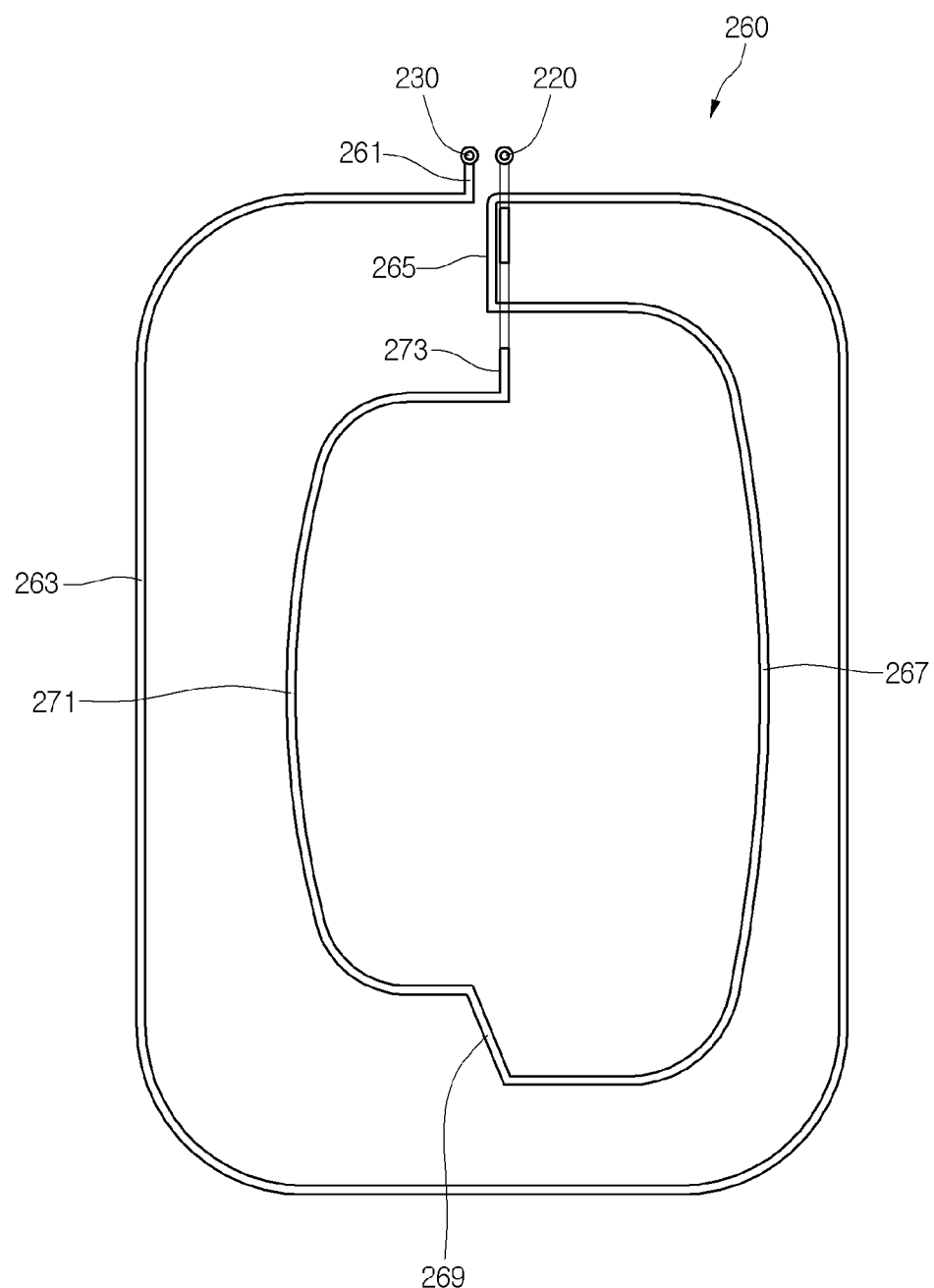
FIGS. 14a and 14b are plan views showing a lower transmission coil of FIG. 12.
Figure 14B:
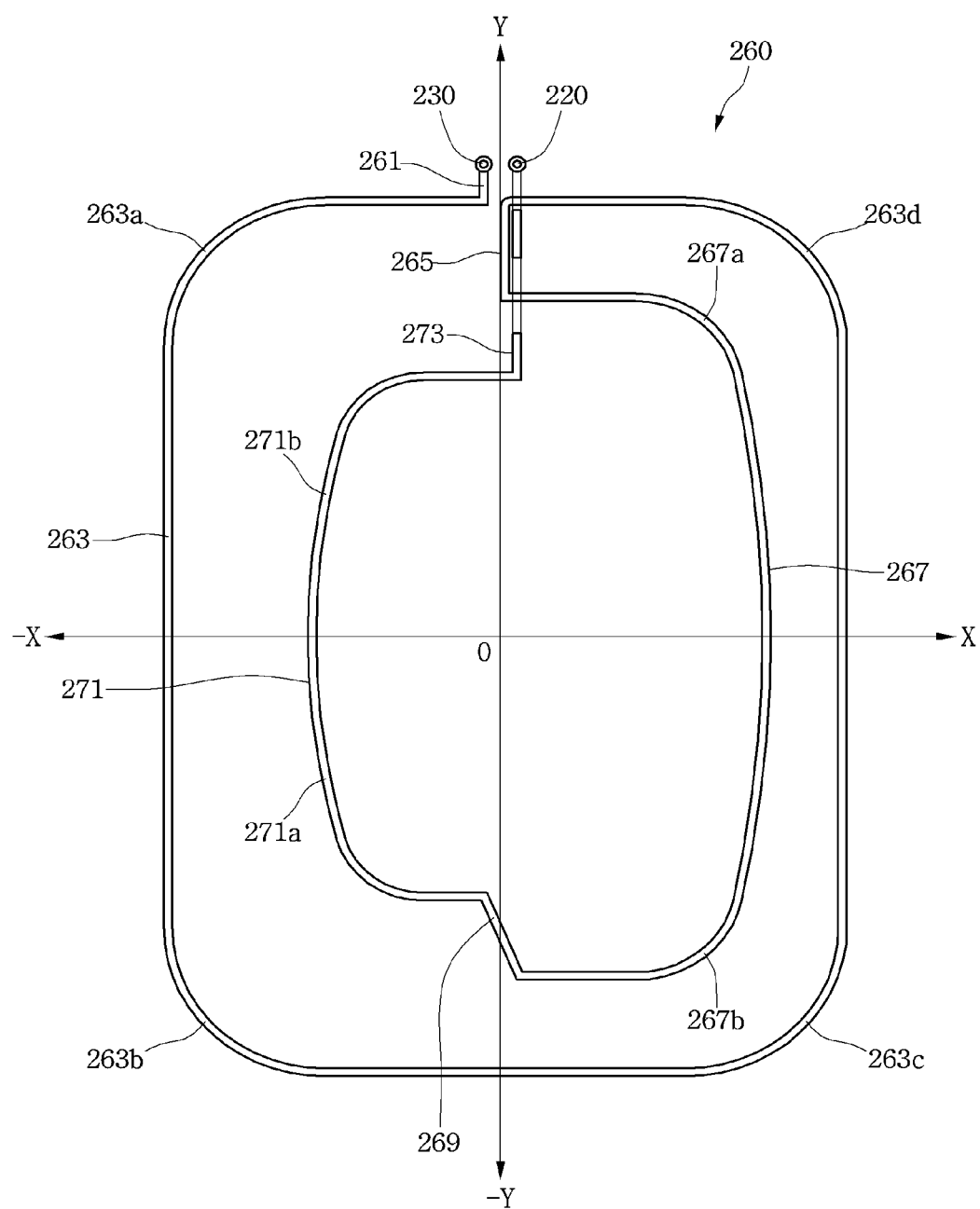
Figure 15:
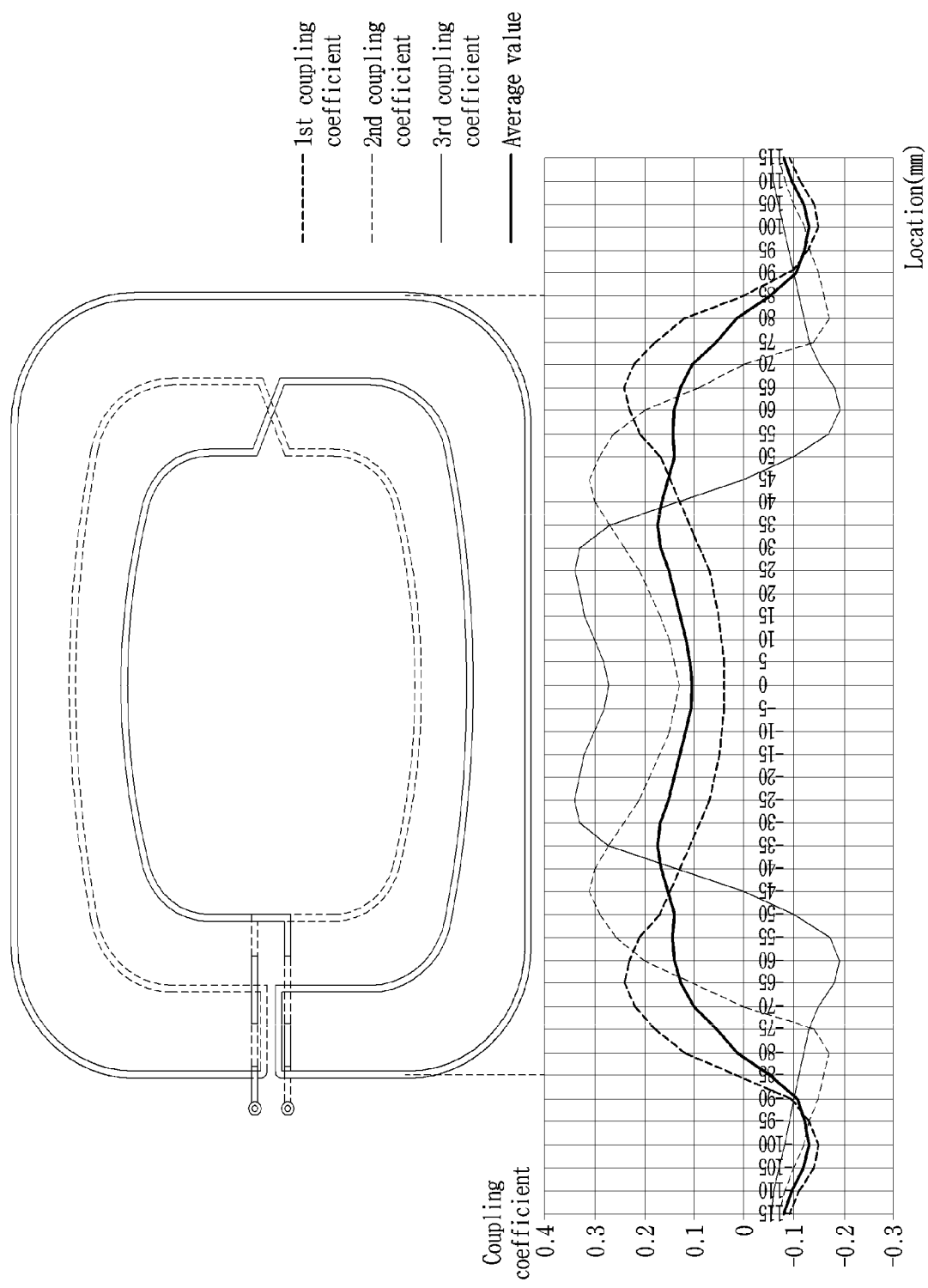
FIG. 15 is a graph to explain a coupling coefficient of a wireless transmission unit according to the second embodiment of the disclosure.

FIG. 12 is an exploded perspective view showing a wireless transmission unit according to a second embodiment of the disclosure. FIGS. 13a and 13b are plan views showing an upper transmission coil of FIG. 12. FIGS. 14a and 14b are plan views showing a lower transmission coil of FIG. 12. FIG. 15 is a graph to explain a coupling coefficient of a wireless transmission unit according to the second embodiment of the disclosure.

Referring to FIGS. 12, 13a, 13b, 14a, and FIG. 14b, a wireless transmission unit 200 according to the present embodiment includes a mounting member 210, a first terminal 220, a second terminal 230, an upper transmission coil 240, a lower transmission coil 260, and a shielding member 280. Since components of the present embodiment are similar to the above-described components, the details thereof will be omitted in the following description. In other words, the present embodiment may have the same description as that of the above-described embodiment since the outer coil part 243 of the upper transmission coil 240 includes first to fourth outer coil parts 243a, 243b, 243c, and 243d, which are the same as the first to fourth outer coil parts 143a, 143b, 143c, and 143d according to the above-described embodiment in terms of shapes and arrangement relationships. The present embodiment may have the same description as that of the above-described embodiment since the first inner coil part 247 of the upper transmission coil 240 includes a $(1-1)^{th}$ inner coil part 247a and a $(1-2)^{th}$ inner coil part 247b, which are the same as the first and second inner coil parts 147a and 147b according to the above-described embodiment in terms of shapes and arrangement relationships. The present embodiment may have the same description as that of the above-described embodiment since the outer connection part 241 and the first extension part 245 are the same as the outer connection part 141 and the extension part 145 according to the above-described embodiment in terms of shapes and arrangement relationships.

The upper transmission coil 240 includes an outer connection part 241, an outer coil part 243, a first extension part 245, a first inner coil part 247, a second extension part 249, a second inner coil part 251, and an inner connection part 253.

The outer connection part 241 is connected with the first terminal 220. In this case, the outer connection part 241 extends from the first terminal 220. For example, when the first terminal 220 is provided at the right side of the Y axis, the outer connection part 241 may extend at the right side of the Y axis serving as the central axis.

The outer coil part 243 is provided at the outermost part of the upper transmission coil 240. In addition, the outer coil part 243 is connected with the outer connection part 241. In this case, the outer coil part 243 extends from the outer connection part 241. The outer coil part 243 is formed in one-turn. For example, when the first terminal 220 is provided at the right side of the central axis, the outer coil part 243 may extend from the outer connection part 241 clockwise. In addition, the outer coil part 243 may extend from the right side of the central axis to the left side of the central axis.

The first extension part 245 is connected with the outer coil part 243. In this case, the first extension part 245 extends from the outer coil part 243. In this case, the first extension part 245 extends inward of the outer coil part 243. For example, the first terminal 220 is provided at the right side of the central axis, the first extension part 245 may extend from the left side of the central axis.

The first inner coil part 247 extends from a terminated point of the first extension part 245. In addition, the first inner coil part 247 extends from the first extension part 245. In this case, the first inner coil part 247 is provided inward of the outer coil part 243. In other words, the first inner coil part 247 has a radius less than that of the outer coil part 243. In this case, the first inner coil part 247 is formed in a half-turn. For example, when the first terminal 220 is provided at the right side of the central axis, the first inner coil part 247 may extend from the first extension part 245 counterclockwise. In addition, the first inner coil part 247 may extend at the left side of the Y axis serving as the central axis.

The second extension part 249 is connected with the first inner coil part 247. In this case, the second extension part 249 extends from a terminated point of the first inner coil part 247. In this case, the second extension part 249 extends inward of the first inner coil part 247. For example, when the first terminal 220 is provided at the right side of the Y axis serving as the central axis, the second extension part 249 may extend from the left side of the central axis to the right side of the central axis. In other words, the second extension part 249 may extend from the third quadrant to the second quadrant across the Y axis. In more detail, the second extension part 249 may extend with the directionality from an XY plane to a (−X)(−Y) plane.

The second inner coil part 251 is connected with the second extension part 249. In this case, the second inner coil part 251 extends from a terminated point of the second extension part 249. In this case, the second inner coil part 251 has a radius less than that of the first inner coil part 247. In this case, the second inner coil part 251 is formed in a half-turn. For example, when the first terminal 220 is provided at the right side of the Y axis serving as the central axis, the second inner coil part 251 may extend from the second extension part 249 counterclockwise. In addition, the second inner coil part 251 may extend from the right side of the central axis to the left side of the central axis. In detail, the second inner coil part 251 may include a $(2-1)^{th}$ inner coil part 251a provided at the second quadrant and a $(2-2)^{th}$ inner coil part 251b provided at the first quadrant. The $(2-1)^{th}$ inner coil part 251a may extend in parallel to the X axis or with a vertical distance from the X axis, which is gradually decreased, in the positive X (X) axis direction. Then, the $(2-1)^{th}$ inner coil part 251a may extend in parallel to the Y axis or with a vertical distance from the Y axis, which is gradually increased, in the positive Y (Y) axis direction. The $(2-2)^{th}$ inner coil part 251b may extend in parallel to the Y axis or with a vertical distance from the Y axis, which is gradually decreased, in the positive Y (Y) axis direction. Then, the $(2-2)^{th}$ inner coil part 251b may extend in parallel to the X axis or with a vertical distance from the X axis, which is gradually increased, in the negative X (−X) axis direction. In addition, the $(2-1)^{th}$ inner coil part 251a and the $(2-2)^{th}$ inner coil part 251b may be symmetrical to each other about the X axis except for the shapes of the $(2-1)^{th}$ inner coil part 251a and the $(2-2)^{th}$ inner coil part 251b at a starting point and a terminated point thereof.

The inner connection part 253 is connected with the second inner coil part 251. In addition, the inner connection part 253 is connected with the second terminal 230. In this case, the inner connection part 253 extends from a terminated point of the second inner coil part 251, that is, a terminated point of the $(2-2)^{th}$ inner coil part 252b toward the second terminal 230 in parallel to the Y axis in the positive Y (Y) axis direction. For example, when the second terminal 230 is provided at the left side of the Y axis serving as the central axis, the inner connection part 253 may extend at the left side of the central axis. In addition, the inner connection part 253 may include at least one connection via (not shown) formed through the mounting member 210. In other words, the inner connection part 253 may be connected with the second terminal 230 by passing the bottom surface of the mounting member 210 through the connection via so that the inner connection part 253 does not make contact with the lower transmission coil 260.

Meanwhile, the lower transmission coil 260 includes an outer connection part 261, an outer coil part 263, a first extension part 265, a first inner coil part 267, a second extension part 269, a second inner coil part 271, and an inner coil part 273.

In other words, the present embodiment may have the same description as that of the above-described embodiment since the outer coil part 263 of the lower transmission coil 260 includes first to fourth outer coil parts 263a, 263b, 263c, and 263d, which are the same as the first to fourth outer coil parts 163a, 163b, 163c, and 163d according to the above-described embodiment in terms of shapes and arrangement relationships. The present embodiment may have the same description as that of the above-described embodiment since the first inner coil part 267 of the upper transmission coil 260 includes a $(1-1)^{th}$ inner coil part 267a and a $(1-2)^{th}$ inner coil part 267b, which are the same as the first and second inner coil parts 167a and 167b according to the above-described embodiment in terms of shapes and arrangement relationships. The present embodiment may have the same description as that of the above-described embodiment since the outer connection part 261 and the first extension part 265 are the same as the outer connection part 161 and the extension part 165 according to the above-described embodiment in terms of shapes and arrangement relationships.

The outer connection part 261 is connected with the second terminal 230. The outer connection part 261 extends from the second terminal 230. For example, when the second terminal 230 is provided at the left side of the central axis, the outer connection part 261 may extend at the left side of the central axis.

The outer coil part 263 is provided at the outermost part of the lower transmission coil 260. In addition, the outer coil part 263 is connected with the outer connection part 261. In this case, the outer coil part 263 extends from the outer connection part 261. In this case, the outer coil part 263 is formed in one-turn. For example, when the second terminal 230 is provided at the left side of the central axis, the outer coil part 263 may extend counterclockwise from the outer connection part 261. In addition, the outer coil part 263 may extend from the left side of the central axis to the right side of the central axis.

The first extension part 265 is connected with the outer coil part 263. In this case, the first extension part 265 extends from the outer coil part 263. In this case, the first extension part 265 extends inward of the outer coil part 263. For example, when the second terminal 230 is provided at the left side of the central axis, the first extension part 265 may extend at the right side of the central axis.

The first inner coil part 267 is connected with the first extension part 265. In addition, the first inner coil part 267 extends from the first extension part 265. In this case, the first inner coil part 267 is provided inward of the outer coil part 263. In other words, the first inner coil part 267 has a radius less than that of the outer coil part 263. In this case, the first inner coil part 267 is formed in a half-turn. For example, when the second terminal 230 is provided at the left side of the central axis, the first inner coil part 267 may extend clockwise from the first extension part 265. In addition, the first inner coil part 267 may extend at the right side of the central axis.

The second inner connection part 269 is connected with the first inner coil part 267. In addition, the second inner connection part 269 extends from the first inner coil part 267. In this case, the second extension part 269 extends inward of the first inner coil part 267. For example, when the second terminal 230 is provided at the left side of the central axis, the second extension part 269 may extend from the right side of the central axis to the left side of the central axis.

The second inner coil part 271 is connected with the second extension part 269. In addition, the second inner coil part 271 extends from the second extension part 269. In this case, the second inner coil part 271 has a radius less than that of the first inner coil part 267. In this case, the second inner coil part 271 is formed in a half-turn. For example, when the second terminal 230 is provided at the left side of the central axis, the second inner coil part 271 may extend clockwise from the second extension part 269. In addition, the second inner coil part 271 may extend from the left side of the central axis to the right side of the central axis.

The inner connection part 273 is connected with the second inner coil part 271. In addition, the inner connection part 273 is connected with the first terminal 220. In this case, the inner connection part 273 extends from the second inner coil part 271 to the first terminal 220. For example, when the first terminal 220 is provided at the right side of the central axis, the inner connection part 273 may extend at the right side of the central axis. In addition, the inner connection part 273 may include at least one connection via (not shown) formed through the mounting member 210. In other words, the inner connection part 273 may be connected with the first terminal 220 by passing the top surface of the mounting member 210 through the connection via so that the inner connection part 273 does not make contact with the upper transmission coil 240.

In other words, the outer coil part 243 of the upper transmission coil 240 vertically faces the outer coil part 263 of the lower transmission coil 260. In addition, the outer connection part 241, the first extension part 245, the first inner coil part 247, the second extension part 259, the second inner coil part 251, and the inner connection part 253 of the upper transmission coil 240 are provided in opposition to the outer connection part 261, the first extension part 265, the first inner coil part 267, the second extension part 269, the second inner coil part 271, and the inner connection part 273 of the lower transmission coil 260, respectively, about the central axis. Accordingly, the upper and lower transmission coils 240 and 260 have a bilaterally symmetrical shape about the central axis. In other words, the description of the symmetrical shape according to the first embodiment may be applicable to the present embodiment. According to the present embodiment, the second inner coil part 271 of the lower transmission coil 260 making a difference from the previous embodiment may include $(2-1)^{th}$ and $(2-2)^{th}$ inner coil parts 271a and 271b. The $(2-1)^{th}$ inner coil part 271a of the lower transmission coil 260 may be symmetrical to the $(2-1)^{th}$ inner coil part 251a of the second inner coil part 251 provided in the upper transmission coil 240 and provided at the second quadrant about the Y axis. The $(2-2)^{th}$ inner coil part 271b of the lower transmission coil 260 may be symmetrical to the $(2-2)^{th}$ inner coil part 251b of the second inner coil part 251 provided in the upper transmission coil 240 and provided at the first quadrant about the Y axis.

In this case, the distance between the outer coil part 243 and the first inner coil part 247 of the upper transmission coil 240 and the distance between the outer coil part 263 and the first inner coil part 267 of the lower transmission coil 260 may be formed corresponding to ½ of the size of the reception coil. Meanwhile, the distance between the outer coil part 243 and the inner coil part 247 of the upper transmission coil 240 may be formed to the extent that a position where the coupling coefficient between the outer coil part 243 of the upper transmission coil 240 and the reception coil becomes maximized is matched with a position where the coupling coefficient between the second inner coil part 251 and the reception coil becomes zero. Similarly, the distance between the outer coil part 263 and the second inner coil part 271 of the lower transmission coil 260 may be formed to the extent that a position where the coupling coefficient between the outer coil part 263 of the lower transmission coil 260 and the reception coil becomes maximized is matched with a position where the coupling coefficient between the second inner coil part 271 and the reception coil becomes zero.

According to the present embodiment, the coupling coefficient between the wireless transmission unit 200 and the wireless reception unit 31 (see FIG. 1) is substantially constant according to locations as shown in FIG. 15. In other words, the coupling coefficient between the wireless transmission unit 200 and the wireless reception unit 31 is formed equally to an average value of a first coupling coefficient formed between the outer coil part 243 of the upper transmission coil 240 and the outer coil part 263 of the lower transmission coil 260, a second coupling coefficient formed between the first inner coil part 247 of the upper transmission coil 240 and the first inner coil part 267 of the lower transmission coil 260, and a third coupling coefficient between the second inner coil unit 251 of the upper transmission coil 240 and the second inner coil unit 271 of the lower transmission coil 260. Accordingly, the coupling coefficient between the wireless transmission unit 200 and the wireless reception unit 31 has a higher value even if the wireless reception unit 31 approaches the centers of the upper and lower transmission coils 240 and 260. Accordingly, the chargeable area of the wireless transmission unit 200 is enlarged.

Figure 16:
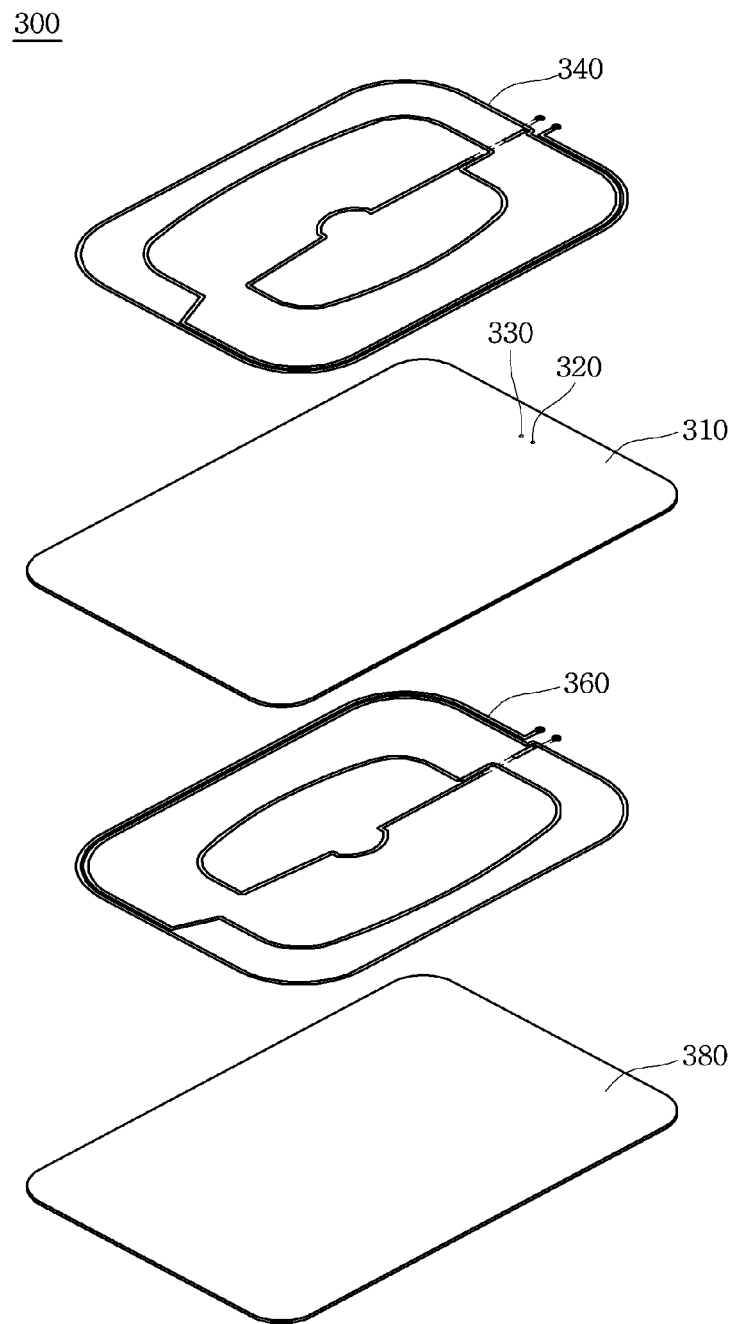
FIG. 16 is an exploded perspective view showing a wireless transmission unit according to a third embodiment of the disclosure.
Figure 17A:
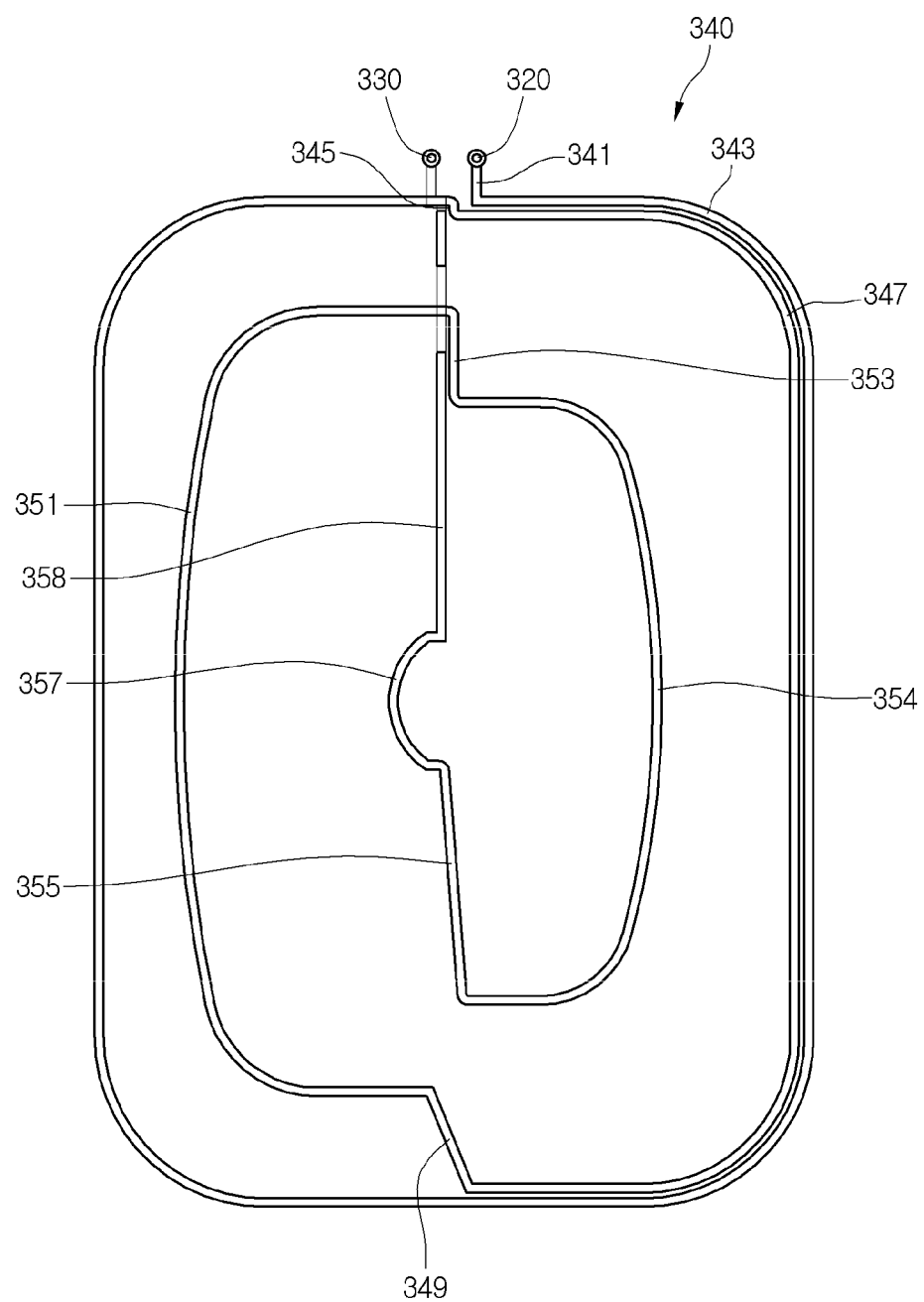
FIGS. 17a and 17b are plan views showing an upper transmission coil of FIG. 16.
Figure 17B:
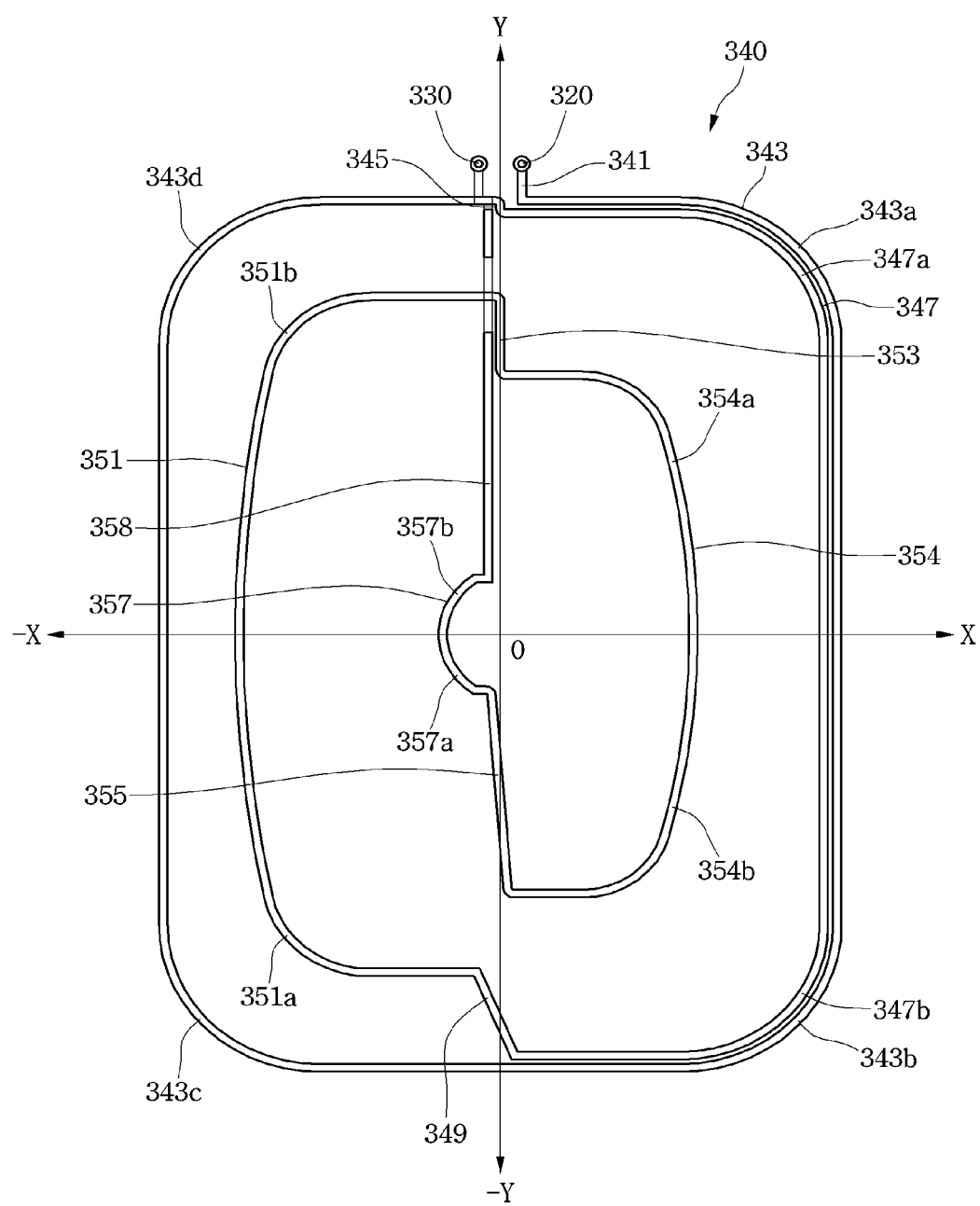
Figure 18A:
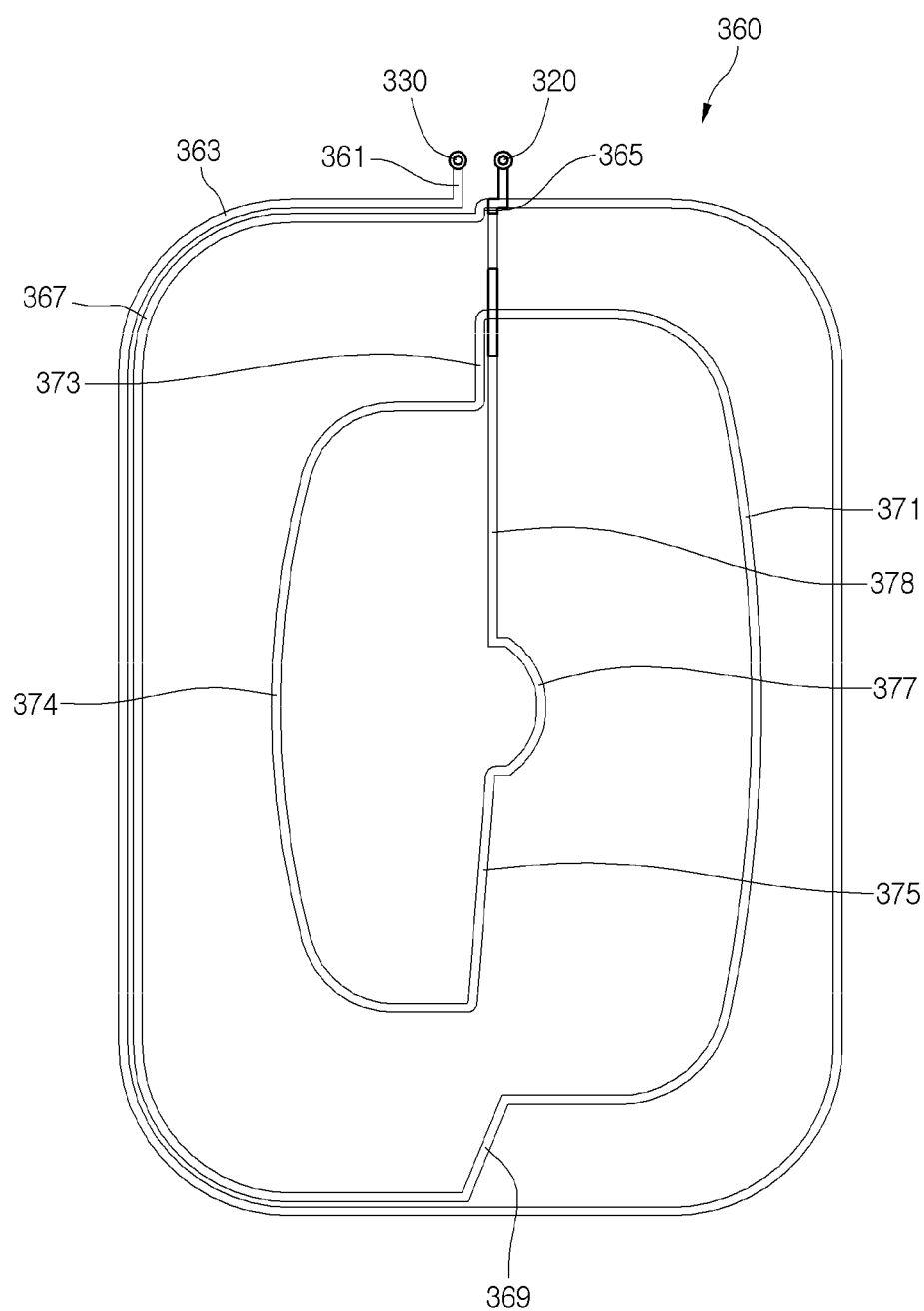
FIGS. 18a and 18b are plan views showing a lower transmission coil of FIG. 16.
Figure 18B:
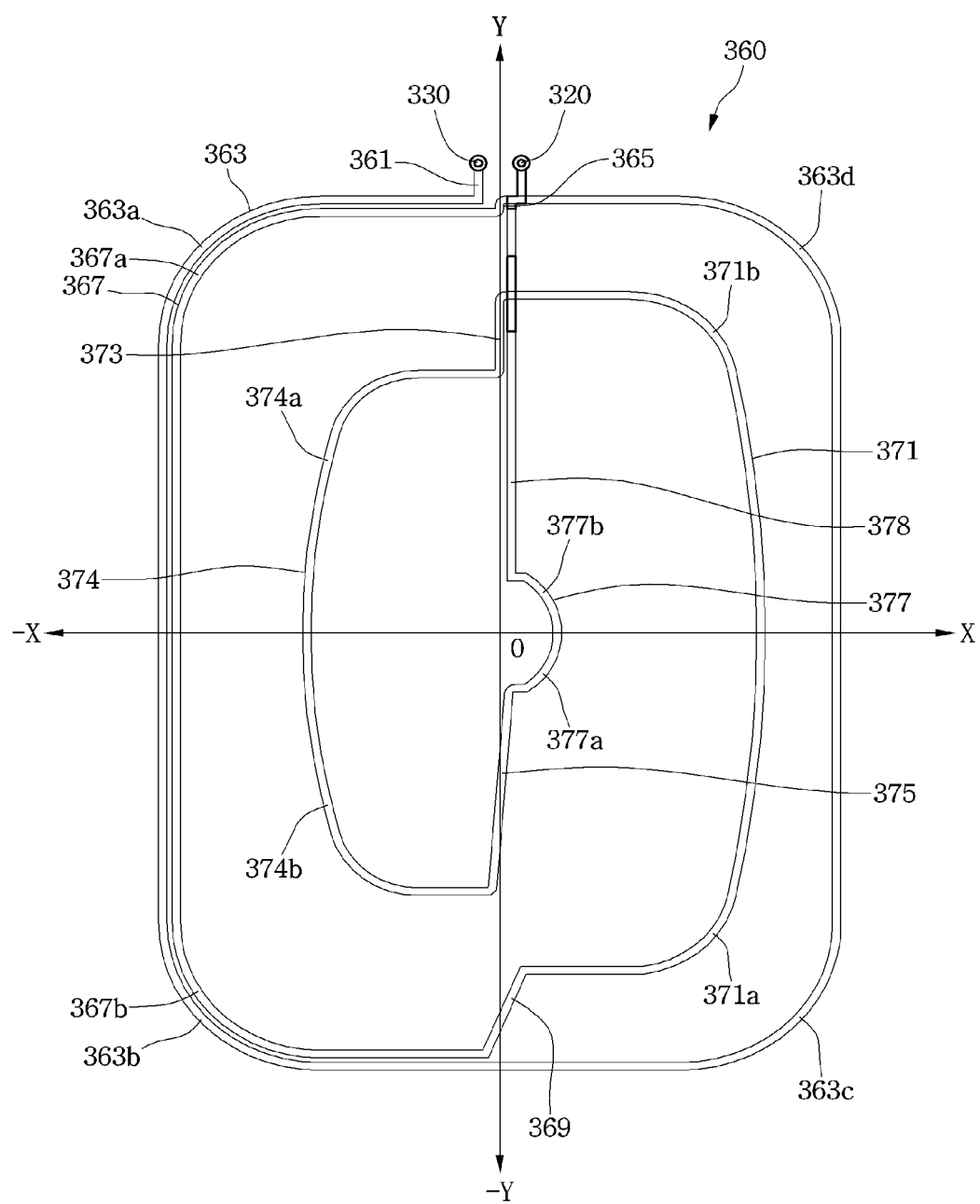
Figure 20:
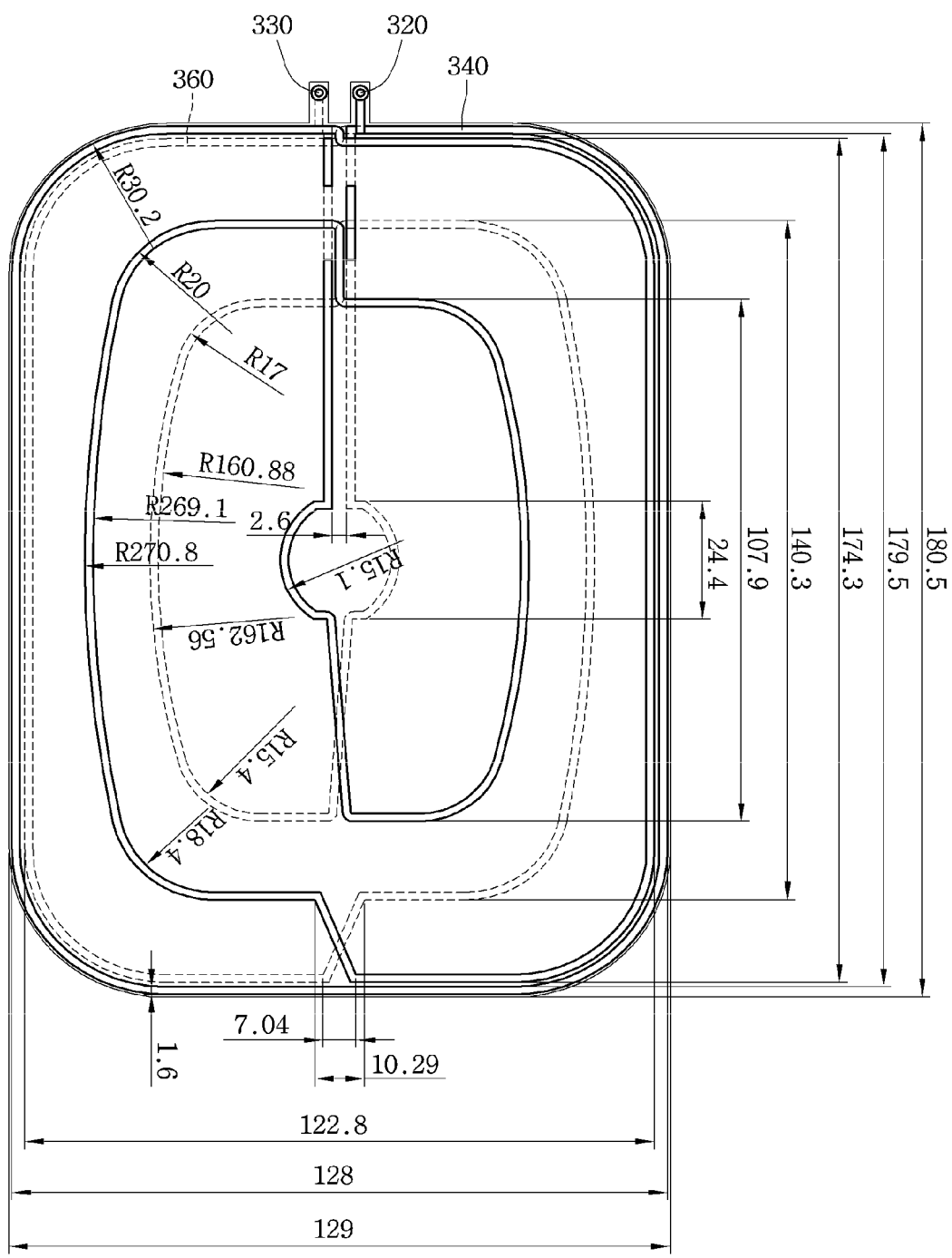
FIG. 20 is a view showing a realization example of the wireless transmission unit according to the third embodiment of the disclosure.

FIG. 16 is an exploded perspective view showing a wireless transmission unit according to a third embodiment of the disclosure, and FIGS. 17a and 17b are plan views showing an upper transmission coil of FIG. 16. FIGS. 18a and 18b are plan views showing a lower transmission coil of FIG. 16. FIG. 19 is a graph to explain a coupling coefficient of a wireless transmission unit according to the third embodiment of the disclosure. FIG. 20 is a view showing a realization example of the wireless transmission unit according to the third embodiment of the disclosure.

Referring to FIGS. 16, 17a, 17b, 18a, and 18b, a wireless transmission unit 300 includes a mounting member 310, a first terminal 320, a second terminal 330, an upper transmission coil 340, a lower transmission coil 360, and a shielding member 380. Since components of the present embodiment are similar to corresponding components of the previous embodiment, the details of the components of the disclosure will be omitted.

The upper transmission coil 340 includes an outer connection part 341, an outer coil part 343, a first extension part 345, a first inner coil part 347, a second extension part 349, a second inner coil part 351, a third extension part 353, a third inner coil part 354, a fourth extension part 355, a fourth inner coil part 357, and an inner connection part 358.

The outer connection part 341 is connected with the first terminal 320. In this case, the outer connection part 341 extends from the first terminal 320 in parallel to the Y axis in the negative Y (−Y) axis direction. For example, when the first terminal 320 is provided at the right side of the Y axis serving as the central axis, the outer connection part 341 may extend at the right side of the Y axis serving as the central axis. In other words, the outer connection part 341 starts from the first terminal 320 and extends in parallel to the Y axis in the negative Y (−Y) axis direction by a predetermined length. In this case, the predetermined length is a length corresponding to an extent that the outer connection part 341 may be provided only at the first quadrant without extending to the second quadrant.

The outer coil part 343 is provided at the outermost part of the upper transmission coil 340. In addition, the outer coil part 343 is connected with the outer connection part 341. In this case, the outer coil part 343 extends from a terminated point of the outer connection part 341. The outer coil part 343 is formed in one-turn. For example, when the first terminal 320 is provided at the right side of the central axis, the outer coil part 343 may extend clockwise from the outer connection part 341. In addition, the outer coil part 343 may extend from the right side of the central axis to the left side of the Y axis serving as the central axis.

In detail, the outer coil part 343 may include a first outer coil part 343a provided at the first quadrant, a second outer coil part 343b provided at the second quadrant, the third outer coil part 343c provided at the third quadrant, and the fourth outer coil part 343d provided at the fourth quadrant, and the first to fourth outer coil parts 343a to 343d are integrated with each other. The first outer coil part 343a may extend to an intersection between the first outer coil part 343a and the X axis from a terminated point of the outer connection part 341. In other words, the first outer coil part 343a extends in parallel to the X axis in the positive X (X) axis direction from the terminated point of the outer connection part 341. Then, the first outer coil part 343a extends in parallel to the Y axis in the negative Y (−Y) axis direction. When the direction of the first outer coil part 343a is changed from the negative Y (−Y) axis direction from the positive X (X) axis direction, the direction of the first outer coil part 343a may be changed with a predetermined curvature. In addition, the second outer coil part 343b may extend from the terminated point of the first outer coil part 343a to the intersection between the second outer coil part 343b and the Y axis. In other words, the second outer coil part 343b extends in parallel to the Y axis in the negative Y (−Y) axis direction from the terminated point of the first outer coil part 343a, and extends in parallel to the X axis in the negative X (−X) axis direction. When the direction of the second outer coil part 343b is changed from the negative Y (−Y) axis direction to the negative X (−X) axis direction, the direction of the second outer coil part 343b may be changed with a predetermined curvature. In addition, the third outer coil part 343c may extend from the terminated point of the second outer coil part 343b to the intersection between the third outer coil part 343c and the X axis. In other words, the third outer coil part 343c extends in parallel to the X axis in the negative X (−X) axis direction from the terminated point of the second outer coil part 343b, and extends in parallel to the Y axis in the positive Y (Y) axis direction. When the direction of the third outer coil part 343c is changed from the negative X (−X) axis direction to the positive Y (Y) axis direction, the direction of the third outer coil part 343c may be changed with a predetermined curvature. In addition, the fourth outer coil part 343d may extend from the terminated point of the third outer coil part 343c to the intersection between the fourth outer coil part 343d and the Y axis. In other words, the fourth outer coil part 343d extends in parallel to the Y axis in the positive Y (Y) axis direction from the terminated point of the third outer coil part 343c, and extends in parallel to the X axis in the positive X (X) axis direction. When the direction of the fourth outer coil part 343d is changed from the positive Y (Y) axis direction to the positive X axis direction, the direction of the fourth outer coil part 343d may be changed with a predetermined curvature.

In addition, the first outer coil part 343a and the second outer coil part 343b may be symmetrical to each other about the X axis, and the first outer coil part 343a and the fourth outer coil part 343d may be symmetrical to each other about the Y axis. The first outer coil part 343a and the third outer coil part 343c may be symmetrical to each other about the origin (0).

Meanwhile, although description has been made regarding that the first to fourth outer coil parts 343a, 343b, 343c, and 343d partially have a linear shape and partially have a curved shape with a curvature, the embodiment is not limited thereto. In other words, the whole shape of the first to fourth outer coil parts 343a, 343b, 343c, and 343d may have an oval shape or a circular shape. Accordingly, when the first outer coil part 343a extends in the positive X (X) axis direction, the distance between the first outer coil part 343a and the X axis may be gradually decreased. When the first outer coil part 343a extends in the negative Y (−Y) axis direction, the distance between the first outer coil part 343a and the Y axis may be gradually increased. In addition, when the second outer coil part 343b extends in the negative Y (−Y) axis direction, the distance between the second outer coil part 343b and the Y axis may be gradually decreased. When the second outer coil part 343b extends in the negative X (−X) axis direction, the distance between the second outer coil part 343b and the X axis may be gradually increased. In addition, when the third outer coil part 343c extends in the negative X (−X) axis direction, the distance between the third outer coil part 343c and the X axis may be gradually decreased. When the third outer coil part 343c extends in the positive Y (Y) axis direction, the distance between the third outer coil part 343c and the Y axis may be gradually increased. In addition, when the fourth outer coil part 343d extends in the positive Y (Y) axis direction, the distance between the fourth outer coil part 343d and the Y axis may be gradually decreased. When the fourth outer coil part 343d extends in the positive X (X) axis direction, the distance between the fourth outer coil part 343d and the X axis may be gradually increased. Accordingly, the whole shape of the outer coil part 343 may have a circular shape or an oval shape.

The extension part 345 is connected with the outer coil part 343. In this case, the extension part 345 extends from a terminated point of the outer coil part 343. The extension part 345 extends inward of the outer coil part 343. For example, when the first terminal 320 is provided at the right side of the Y axis serving as the central axis, the extension part 345 may extend from the left side of the Y axis serving as the central axis.

The first inner coil part 347 is connected with the first extension part 345. The first inner coil part 347 extends from a terminated point of the first extension part 345. Accordingly, the first extension part 345 may connect the terminated point of the outer coil part 343 with a starting point of the first inner coil part 347 across the Y axis. In this case, the first inner coil part 347 is provided inward of the outer coil part 343. In other words, the first inner coil part 347 has a radius less than that of the outer coil part 343. In this case, the first inner coil part 347 is formed in a half-turn. For example, when the first terminal 320 is provided at the right side of the Y axis serving as the central axis, the first inner coil part 347 may extend from the first extension part 345 clockwise. In addition, the first inner coil part 347 may extend at the right side of the Y axis serving as the central axis. In addition, the distance from the origin to the first inner coil part 347 may be shorter than the distance from the origin to the outer coil part 343. In this case, the distance between the first inner coil part 347 and the outer coil part 343 may be formed to the extent that the first inner coil part 347 and the outer coil part 343 are significantly close to each other.

In addition, the first inner coil part 347 may include a (1-1) inner coil part 347a provided at the first quadrant and a $(1-2)^{th}$ inner coil part 347b provided at the second quadrant, in which the $(1-1)^{th}$ inner coil part 347a is integrated with the $(1-2)^{th}$ inner coil part 347b. In addition, the $(1-1)^{th}$ inner coil part 347a extends from the terminated point of the first extension part 345 to the intersection between the $(1-1)^{th}$ inner coil part 347a and the X axis. In other words, the $(1-1)^{th}$ inner coil part 347a may extend in parallel to the X axis or with a vertical distance from the X axis, which is gradually decreased, in the positive X (X) axis direction and may extend in parallel to the Y axis or with a vertical distance from the Y axis, which is gradually decreased, in the negative Y (–Y) axis direction. When the direction of the $(1-1)^{th}$ inner coil part 347a is changed from the negative Y (–Y) axis direction from the positive X (X) axis direction, the direction of the $(1-1)^{th}$ inner coil part 347a may be changed with a predetermined curvature. In addition, the $(1-2)^{th}$ inner coil part 347b extends from the terminated point of the $(1-1)^{th}$ inner coil part 347a within the second quadrant. In other words, the $(1-2)^{th}$ inner coil part 347b may extend in parallel to the Y axis or with a vertical distance from the Y axis, which is gradually decreased, in the negative Y (–Y) axis direction, and may extend in parallel to the X axis or with a vertical distance from the X axis, which is gradually decreased, in the negative X (–X) axis direction. When the direction of the $(1-2)^{th}$ inner coil part 347b is changed from the negative Y (–Y) axis direction from the negative X (–X) axis direction, the direction of the $(1-2)^{th}$ inner coil part 347b may be changed with a predetermined curvature. In addition, the $(1-1)^{th}$ inner coil part 347a and the $(1-2)^{th}$ inner coil part 347b may be symmetrical to each other about the X axis.

The second extension part 349 is connected with the first inner coil part 347. In this case, the second extension part 349 extends from the terminated point of the first inner coil part 347. In this case, the second extension part 349 extends inward of the first inner coil part 347. For example, when the first terminal 320 is provided at the right side of the central axis, the second extension part 349 may extend from the right side of the central axis to the left side of the Y axis serving as the central axis. In other words, the second extension part 349 may extend from the second quadrant to the third quadrant across the Y axis. In more detail, the second extension part 349 may extend with the directionality from an (X)(–Y) plane to a (–X)(Y) plane.

The second inner coil part 351 is connected with the second extension part 349. In addition, the second inner coil part 351 extends from the terminated point of the second extension part 349. In this case, the second inner coil part 351 has a radius less than that of the first inner coil part 347. In this case, the second inner coil part 351 is formed in a half-turn. For example, when the first terminal 320 is provided at the right side of the Y axis serving as the central axis, the second inner coil part 351 may extend clockwise from the second extension part 329. In addition, the second inner coil part 351 may extend at the left side of the Y axis serving as the central axis.

In detail, the second inner coil part 351 may include a $(2-1)^{th}$ inner coil part 351a provided at the third quadrant and a $(2-2)^{th}$ inner coil part 351b provided at the fourth quadrant, in which the $(2-1)^{th}$ inner coil part 351a is integrated with the a $(2-2)^{th}$ inner coil part 351b. In addition, the $(2-1)^{th}$ inner coil part 351a extends in the negative X (–X) axis direction from the terminated point of the second extension part 349 and extends in the positive Y (Y) axis until the $(2-1)^{th}$ inner coil part 351a meets the X axis. When the direction of the $(2-1)^{th}$ inner coil part 351a is changed from the negative X (–X) axis direction to the positive Y (Y) axis direction, the direction of the $(2-1)^{th}$ inner coil part 351a may be changed with a predetermined curvature. In addition, the (2-2) inner coil part 351b extends in the positive Y (Y) axis direction from the terminated point of the $(2-1)^{th}$ inner coil part 351a and extends in the positive X (X) axis direction within the fourth quadrant. When the direction of the $(2-2)^{th}$ inner coil part 351b is changed from the positive Y (Y) axis direction to the positive X (X) axis direction, the direction of the $(2-1)^{th}$ inner coil part 351a may be changed with a predetermined curvature. Meanwhile, although description has been made regarding that the $(2-1)^{th}$ inner coil part 351a and the $(2-2)^{th}$ inner coil part 351b partially have a linear shape and partially have a curved shape with a curvature, the embodiment is not limited thereto. In other words, the whole shape of the $(2-1)^{th}$ inner coil part 351a and the $(2-2)^{th}$ inner coil part 351b may have an oval shape, a circular shape, or a rectangular shape. Accordingly, when the $(2-1)^{th}$ inner coil part 351a extends in the negative X (–X) axis direction, the distance between the $(2-1)^{th}$ inner coil part 351a and the X axis may be constant or gradually decreased. When the $(2-1)^{th}$ inner coil part 351a extends in the positive Y (Y) axis direction, the distance between the $(2-1)^{th}$ inner coil part 351a and the Y axis may be constant or gradually increased. In addition, when the $(2-2)^{th}$ inner coil part 351b extends in the positive Y (Y) axis direction, the distance between the $(2-2)^{th}$ inner coil part 351b and the Y axis may be constant or gradually decreased. When the $(2-2)^{th}$ inner coil part 351b extends in the positive X (X) axis direction, the distance between the $(2-2)^{th}$ inner coil part 351b and the X axis may be constant or gradually increased.

Meanwhile, the $(2-1)^{th}$ inner coil part 351a and the $(2-2)^{th}$ inner coil part 351b may be symmetrical to each other about the X axis except for the shapes of the $(2-1)^{th}$ inner coil part 351a and the $(2-2)^{th}$ inner coil part 251b at a starting point and a terminated point thereof.

The third extension part 353 is connected with the second inner coil part 351. In this case, the third extension part 353 extends in parallel to the Y axis in the negative Y (–Y) axis direction from the terminated point of the second inner coil part 351, that is, the terminated point of the $(2-2)^{th}$ inner coil part 351b. In this case, the third extension part 353 extends inward of the second inner coil part 351. For example, when the first terminal 320 is provided at the right side of the Y axis serving as a central axis, the third extension part 353 extends from the left side of the central axis to the right side of the Y axis serving as the central axis.

The third inner coil part 354 is connected with the third extension part 353. In this case, the third inner coil part 354 extends from the terminated point of the third extension part 353. In this case, the third inner coil part 354 has a radius less than that of the second inner coil part 351. In this case, the third inner coil part 354 is formed in a half-turn. For example, when the first terminal 320 is provided at the right side of the central axis, the third inner coil part 354 may extend clockwise from the third extension part 353. In addition, the third inner coil part 354 may extend at the right side of the central axis.

In detail, the third inner coil part 354 may include a $(3-1)^{th}$ inner coil part 354a provided at the first quadrant and a $(3-2)^{th}$ inner coil part 354b provided at the second quadrant. The $(3-1)^{th}$ inner coil part 354a may extend in parallel to the X axis or with the vertical distance from the X axis, which is gradually decreased, in the positive X (X) axis direction, and may extend in parallel to the Y axis or with the vertical distance from the Y axis, which is gradually increased, in the negative Y (-Y) axis direction. The $(3-2)^{th}$ inner coil part 354b may extend in parallel to the Y axis or with the vertical distance from the Y axis, which is gradually decreased, in the negative Y (-Y) axis direction, and may extend in parallel to the X axis or with the vertical distance from the X axis, which is gradually increased, in the negative X (-X) axis direction. In addition, the $(3-1)^{th}$ inner coil part 354a and the $(3-2)^{th}$ inner coil part 354b may be symmetrical to each other about the X axis except for the shapes of the $(3-1)^{th}$ inner coil part 354a and the $(3-2)^{th}$ inner coil part 354b at a starting point and a terminated point thereof.

The fourth extension part 355 is connected with the third inner coil part 354. In this case, the fourth extension part 355 extends from a terminated point of the third inner coil part 354, that is, the terminated point of the $(3-2)^{th}$ inner coil part 354b. In this case, the fourth extension part 355 extends inward of the third inner coil part 354. For example, when the first terminal 320 is provided at the right side of the Y axis serving as the central axis, the fourth extension part 355 may extend from the right side of the central axis to the left side of the Y axis serving as the central axis. In other words, the fourth extension part 355 may extend from the second quadrant from the third quadrant across the Y axis. In more detail, the fourth extension part may extend in the positive Y (Y) axis direction with the directionality from an X(-Y) plane to a (-X)Y plane.

The fourth inner coil part 357 is connected with the fourth extension part 355. In this case, the fourth inner coil part 357 extends from the terminated point of the fourth extension part 355. In this case, the fourth inner coil part 357 has a radius less than that of the third inner coil part 354. In this case, when the fourth inner coil part 357 is formed in a half-turn. For example, when the first terminal 320 is provided at the right side of the Y axis serving as the central axis, the fourth inner coil part 357 may extend clockwise from the fourth extension part 355. In addition, the fourth inner coil part 357 may extend at the left side of the Y axis serving as the central axis.

In detail, the fourth inner coil part 357 may include a $(4-1)^{th}$ inner coil part 357a provided at the third quadrant and a $(4-2)^{th}$ inner coil part 357b provided at the fourth quadrant. The (4-1) inner coil part 357a may extend in the negative X (-X) axis direction and extend in the positive Y (Y) axis direction while the whole shape of the $(4-1)^{th}$ inner coil part 357a has a predetermined curvature. The $(4-2)^{th}$ inner coil part 357b may extend in the positive Y (Y) axis direction and extend in the positive X (X) axis direction while the whole shape of the $(4-2)^{th}$ inner coil part 357b has a predetermined curvature. In addition, the $(4-1)^{th}$ inner coil part 357a and the $(4-2)^{th}$ inner coil part 357b may be symmetrical to each other about the X axis. The inner connection part 358 is connected with the fourth inner coil part 357. In addition, the inner connection part 358 is connected with the second terminal 330. In this case, the inner connection part 358 extends along the Y axis in the positive Y (Y) axis direction from the terminated point of the fourth inner coil part 357, that is, the terminated point of the (4-2) inner coil part 357b toward the second terminal 330. For example, when the second terminal 330 is provided at the left side of the Y axis serving as the central axis, the inner connection part 358 may extend at the left side of the Y axis serving as the central axis. In addition, the inner connection art 358 may include at least one connection via (not shown) formed through the mounting member 310. In other words, the inner connection part 358 may be connected with the second terminal 330 by passing the bottom surface of the mounting member 310 through the connection via when the inner connection part 358 does not make contact with the lower transmission coil 360.

Meanwhile, the lower transmission coil 360 according to the disclosure includes an outer connection part 361, an outer coil part 363, a first extension part 365, a first inner coil part 367, a second extension part 369, a second inner coil part 371, a third extension part 373, a third inner coil part 374, a fourth extension part 375, a fourth inner coil part 377, and an inner connection part 378.

The outer connection part 361 is connected with the second terminal 330. In this case, the outer connection part 361 extends from the second terminal 330. For example, when the second terminal 330 is provided at the left side of the central axis, the outer connection part 361 may extend at the left side of the central axis.

The outer coil part 363 is provided at the outermost part of the lower transmission coil 360. In addition, the outer coil part 363 is connected with the outer connection part. In this case, the outer coil part 363 extends from the outer connection part 361. In this case, the outer coil part 363 is formed one-turn. For example, when the second terminal 330 is provided at the left side of the central axis, the outer coil part 363 may extend counterclockwise from the outer connection part 361. In addition, the outer coil part 363 may extend from the left side of the central axis to the right side of the central axis.

The first extension part 365 is connected with the outer coil part 363. In this case, the first extension part 365 extends from the outer coil part 363. In this case, the first extension part 365 extends inward of the outer coil part 363. For example, when the second terminal 330 is provided at the left side of the central axis, the first extension part 365 may extend at the right side of the central axis.

The first inner coil part 367 is connected with the first extension part 365. In addition, the first inner coil part 367 extends from the first extension part 365. In this case, the first inner coil part 367 is provided inward of the outer coil part 363. In other words, the first inner coil part 367 has a radius less than that of the outer coil part 363. In this case, the first inner coil part 367 is formed in a half-turn. For example, when the second terminal 330 is provided at the left side of the central axis, the first inner coil part 367 may extend counterclockwise from the first extension part 365. In addition, the first inner coil part 367 may extend at the left side of the central axis.

The second extension part 369 is connected with the first inner coil part 367. In this case, the second extension part 369 extends from the first inner coil part 367. In this case, the second extension part 368 extends inward of the first inner coil part 367. For example, when the second terminal 330 is provided at the left side of the central axis, the second extension part 369 may extend from the left side of the central axis to the right side of the central axis.

The second inner coil part 371 is connected with the second extension part 369. In addition, the second inner coil part 371 extends from the second extension part 369. In this case, the second inner coil part 371 has a radius less than that of the first inner coil part 367. In this case, the second inner coil part 371 is formed in a half-turn. For example, when the second terminal 330 is provided at the left side of the central axis, the second inner coil part 371 may extend counterclockwise from the second extension part 369. In addition, the second inner coil part 371 may extend at the right side of the central axis.

The third extension part 373 is connected with the second inner coil part 371. In this case, the third extension part 373 extends from the second inner coil part 371. In this case, the third extension part 373 extends inward of the second inner coil part 371. For example, when the second terminal 330 is provided at the left side of the central axis, the third extension part 373 may be extend at the left side of the central axis.

The third inner coil part 374 is connected with the third extension part 373. In this case, the third inner coil part 374 extends from the third extension part 373. In this case, the third inner coil part 374 has a radius less than that of the second inner coil part 371. In this case, the third inner coil part 374 is formed in a half-turn. For example, when the second terminal 330 is provided at the left side of the central axis, the third inner coil part 374 may be extend counterclockwise from the third extension part 373. In addition, the third inner coil part 373 may extend at the left side of the central axis.

The fourth extension part 375 is connected with the third inner coil part 374. In this case, the fourth extension part 375 extends from the third inner coil part 374. In this case, the fourth extension part 375 extends inward of the third inner coil part 374. For example, when the second terminal 330 is provided at the left side of the central axis, the fourth extension part 375 may extend from the left side of the central axis to the right side of the central axis.

The fourth inner coil part 377 is connected with the fourth extension part 375. In this case, the fourth inner coil part 377 extends from the fourth extension part 375. In this case, the fourth inner coil part 377 has a radius less than that of the third inner coil part 374. In this case, the fourth inner coil part 377 is formed in a half-turn. For example, when the second terminal 330 is provided at the right side of the central axis, the fourth inner coil part 377 may be extend counterclockwise from the fourth extension part 375. In addition, the fourth inner coil part 377 may extend at the right side of the central axis.

The inner connection part 378 is connected with the fourth inner coil part 377. In addition, the inner connection part 378 is connected with the first terminal 320. In this case, the inner connection part 378 extends from the fourth inner coil part 377. For example, when the first terminal 320 is provided at the right side of the central axis, the inner connection part 378 may extend at the right side of the central axis. In addition, the inner connection part 378 may include at least one connection via (not shown) formed through the mounting member 310. In other words, the inner connection part 378 may be connected with the first terminal 320 by passing the bottom surface of the mounting member 310 through the connection via so that the inner connection part 378 does not make contact with the upper transmission coil 340.

In other words, the outer coil part 343 of the upper transmission coil 340 vertically faces the outer coil part 363 of the lower transmission coil 360. In addition, the outer connection part 341, the first extension part 345, the first inner coil part 347, the second extension part 349, the second inner coil part 351, the third extension part 353, the third inner coil part 354, the fourth extension part 355, the fourth inner coil 357, and the inner connection part 358 of the upper transmission coil 340 mutually face the outer connection part 361, the first extension part 365, the first inner coil part 367, the second extension part 369, the second inner coil part 371, the third extension part 373, the third inner coil part 374, the fourth extension part 375, the fourth inner coil part 377, and the inner connection part 378 of the lower transmission coil 360 about the central axis. Accordingly, the upper transmission coil 340 is bilaterally symmetrical to the lower transmission coil 360 about the central axis.

Regarding the details of the symmetrical shape, similarly, the first outer coil part 343a provided at the first quadrant, the second outer coil part 343b provided at the second quadrant, the third outer coil part 343c provided at the third quadrant, and the fourth outer coil part 343d provided at the fourth quadrant in the upper transmission coil 340, the outer coil part 363 of the lower transmission coil 360 may include a first outer coil part 363a provided at the fourth quadrant, the second outer coil part 363b provided at the third quadrant, the third outer coil part 363c provided at the second quadrant, and the fourth outer coil part 363d provided at the first quadrant. Similarly to the first inner coil part 347 of the upper transmission coil 340 including the $(1-1)^{th}$ inner coil part 347a provided at the first quadrant and the $(1-2)^{th}$ inner coil part 347b provided at the second quadrant, the first inner coil part 367 of the lower transmission coil 360 may include a $(1-1)^{th}$ inner coil part 367a provided at the fourth quadrant and a $(1-2)^{th}$ inner coil part 367b provided at the third quadrant. In addition, similarly to the second inner coil part 351 of the upper transmission coil 340 including the $(2-1)^{th}$ inner coil part 351a provided at the third quadrant and the $(2-2)^{th}$ inner coil part 351b provided at the fourth quadrant, the second inner coil part 371 of the lower transmission coil 360 may include a $(2-1)^{th}$ inner coil part 371a provided at the second quadrant and a $(2-1)^{th}$ inner coil part 371a provided at the first quadrant. In addition, similarly to the third inner coil part 354 of the upper transmission coil 340 including the $(3-1)^{th}$ inner coil part 354a provided at the first quadrant and the $(3-2)^{th}$ inner coil part 354b provided at the second quadrant, the third inner coil part 374 of the lower transmission coil 360 may include a $(3-1)^{th}$ inner coil part 374a provided at the fourth quadrant and the $(3-2)^{th}$ inner coil part 374b provided at the third quadrant. In addition, similarly to the fourth inner coil part 357 of the upper transmission coil 340 including the $(4-1)^{th}$ inner coil part 357a provided at the third quadrant and the $(4-2)^{th}$ inner coil part 357b provided at the fourth quadrant, the fourth inner coil part 377 of the lower transmission coil 360 may include a $(4-1)^{th}$ inner coil part 377a provided at the second quadrant and a $(4-2)^{th}$ inner coil part 377b provided at the first quadrant. In addition, the outer connection part 361 of the lower transmission coil 360 may be symmetrical to the outer connection part 341 of the upper transmission coil 340 about the Y axis, and the outer coil part 363 of the lower transmission coil 360 may be symmetrical to the outer coil part 343 of the upper transmission coil 340 about the Y axis. The first extension part 365 of the lower transmission coil 360 may be symmetrical to the first extension part 345 of the upper transmission coil 340 about the Y axis, and the first inner coil part 367 of the lower transmission coil 360 may be symmetrical to the first inner coil part 347 of the upper transmission coil 340 about the Y axis. The second extension part 369 of the lower transmission coil 360 may be symmetrical to the second extension part 349 of the upper transmission coil 340 about the Y axis, and the second inner coil part 371 of the lower transmission coil 360 may be symmetrical to the second inner coil part 351 of the upper transmission coil 340 about the Y axis. The third extension part 373 of the lower transmission coil 360 may be symmetrical to the third extension part 353 of the upper transmission coil 340 about Y axis, and the third inner coil part 374 of the lower transmission coil 360 may be symmetrical to the third inner coil part 354 of the upper transmission coil 340 about the Y axis. The fourth extension part 375 of the lower transmission coil 360 may be symmetrical to the fourth extension part 355 of the upper transmission coil 340 about the Y axis, and the fourth inner coil part 377 of the lower transmission coil 360 may be symmetrical to the fourth inner coil 357 of the upper transmission coil 340. The inner connection part 378 of the lower transmission coil 360 may be symmetrical to the inner connection part 358 of the upper transmission coil 340 about the Y axis.

In this case, the distance between the outer coil part 343 and the second inner coil part 351 of the upper transmission coil 340 and the distance between the outer coil part 363 and the second inner coil part 371 of the lower transmission coil 360 may be formed corresponding to ½ of the size of the reception coil. Meanwhile, the distance between the outer coil part 343 and the third inner coil part 354 of the upper transmission coil 340 may be formed to the extent that a position where the coupling coefficient between the outer coil part 343 of the upper transmission coil 340 and the reception coil becomes maximized is matched with a position where the coupling coefficient between the third inner coil part 354 and the reception coil becomes zero. Similarly, the distance between the outer coil part 363 and the third inner coil part 374 of the lower transmission coil 360 may be formed to the extent that a position where the coupling coefficient between the outer coil part 363 of the lower transmission coil 360 and the reception coil becomes maximized is matched with a position where the coupling coefficient between the third inner coil part 374 and the reception coil becomes zero.

According to the present embodiment, the coupling coefficient between the wireless transmission unit 300 and the wireless reception unit 31 (see FIG. 1) is substantially constant according to locations as shown in FIG. 19. In other words, the coupling coefficient between the wireless transmission unit 300 and the wireless reception unit 31 is formed equally to an average value of a first coupling coefficient formed between the outer coil part 343 of the upper transmission coil 340 and the outer coil part 363 of the lower transmission coil 360, a second coupling coefficient formed between the second inner coil part 351 of the upper transmission coil 240 and the second inner coil part 371 of the lower transmission coil 360, and a third coupling coefficient between the third inner coil unit 354 of the upper transmission coil 340 and the third inner coil unit 374 of the lower transmission coil 360. Accordingly, the coupling coefficient between the wireless transmission unit 300 and the wireless reception unit 31 has a higher value even if the wireless reception unit 31 approaches the centers of the upper and lower transmission coils 340 and 360. In addition, as the first inner coil part 347 is provided closely to the outer coil part 343 in the upper transmission coil 340, and the first inner coil 367 is provided closely to the outer coil part 363 in the lower transmission coil 360, the first coupling coefficient has a higher value. Accordingly, the chargeable area of the wireless transmission unit 300 is enlarged.

For example, the wireless transmission unit 300 according to the present embodiment may be realized as shown in following table I and FIG. 20. In this case, in the upper transmission coil 340, the distance between the outer coil part 343 and the first inner coil part 347 may be about 5.2 mm, the distance between the first inner coil part 347 and the second inner coil part 351 may be about 34 mm, the distance between the second inner coil part 351 and the third inner coil part 354 may be about 32.4 mm, and the distance between the third inner coil part 354 and the fourth inner coil part 357 may be about 83.5 mm. Similarly, in the lower transmission coil 360, the distance between the outer coil part 363 and the first inner coil part 367 may be about 5.2 mm, the distance between the first inner coil part 367 and the second inner coil part 371 may be about 34 mm, the distance between the second inner coil part 371 and the third inner coil part 374 may be about 32.4 mm, and the distance between the third inner coil part 374 and the fourth inner coil part 377 may be about 83.5 mm.

Further, in the mounting member 310, the width in the Y axis direction may be about 180.5 mm, and the width in the X axis direction may be about 129 mm. In the outer coil part 343 of the upper transmission coil 340 or the outer coil part 363 of the lower transmission coil 360, the width in the Y axis direction is about 179.5 mm and the width in the X axis direction may be about 128 mm. In the first inner coil part 347 of the upper transmission coil 340 or the first inner part 367 of the lower transmission coil 360, the width in the Y axis may be about 174.3 mm. The maximum distance between the first inner coil part 347 of the upper transmission coil 340 and the first inner coil part 367 of the lower transmission coil 360 in the X axis direction may be about 122.8 mm. In the second inner coil part 351 of the upper transmission coil 340 or the second inner coil part 371 of the lower transmission coil 360, the width in the Y axis direction may be about 140.3 mm. In the third inner coil part 354 of the upper transmission coil 340 or the third inner coil part 374 of the lower transmission coil 360, the width in the Y axis direction may be about 107.9 mm. In the fourth inner coil part 357 of the upper transmission coil 340 or the fourth inner coil part 377 of the lower transmission coil 360, the width in the Y axis direction may be about 24.4 mm. The distance in a starting point between the second extension part 349 of the upper transmission coil 340 and the second extension part 369 of the lower transmission coil 360 in the X direction may be about 7.04 mm. The distance in a terminated point between the second extension part 349 of the upper transmission coil 340 and the second extension part 369 of the lower transmission coil 360 in the X direction may be about 10.29 mm. The vertical distance between the inner connection part 358 of the upper transmission coil 340 and the inner connection part 378 of the lower transmission coil 360 may be about 2.6 mm. A circular arc of an area having a curvature of the outer coil part 343 of the upper transmission coil 340 or the outer coil part 363 of the lower transmission coil 360 provides about R 302 mm as a radius of a circle, and a circular arc of an area having a curvature of the second inner coil part 351 of the upper transmission coil 340 or the second inner coil part 371 of the lower transmission coil 360, which is spaced apart from the X axis, provides about 20 mm as a radius of a circle. A circular arc of an area having a curvature and close to the X axis provides about R 269.1 mm as a radius of a circle. A circular arc of an area having a curvature and closer to the X axis provides about R 270.8 mm as a radius of a circle. A circular arc of an area having a curvature of the third inner coil part 354 of the upper transmission coil 340 or the third inner coil part 374 of the lower transmission coil 360, which is located at the negative Y (−Y) area and spaced apart from the X axis, provides about R 15.4 mm as a radius of a circle. A circular arc of an area having a curvature and close to the X axis at a positive Y (Y) axis area provides about R 17 mm as a radius of a circle. A circular arc of an area having a curvature and closer to the X axis at a positive Y (Y) axis area provides about R 160.88 mm as a radius of a circle. A circular arc of an area having a curvature and closer to the X axis at a negative Y (−Y) axis area provides about R 162.56 mm as a radius of a circle. A circular arc of an area having a curvature of the fourth inner coil part 357 of the upper transmission coil 340 or the fourth inner coil part 377 of the lower transmission coil 360 provides about R 15.1 mm as a radius of a circle.

TABLE 1

| Items | Description |
| --- | --- |
| Length of mounting member | 180.5 mm |
| Width of mounting member | 129.0 mm |
| Thickness of mounting member | 0.80 mm |
| Thickness of upper transmission coil | 0.05 mm |
| Thickness of lower transmission coil | 0.05 mm |
| Thickness of shielding member | 0.80 mm |
| Permeability of shielding member | 100 |

According to the disclosure, as the upper transmission coil 140, 240 or 340 and the lower transmission coil 160, 260 or 360 are symmetrical to each other, the magnetic fields formed by the upper transmission coil 140, 240 or 340 and the lower transmission coil 160, 260 or 360 may have uniform shapes. In other words, when the upper transmission coil 140, 240 or 340 and the lower transmission coil 160, 260 or 360 are operated, the shape of the magnetic fields can be uniformly maintained without change. The magnetic fields may have vertical and horizontal symmetrical shapes in the upper transmission coil 140, 240 or 340 and the lower transmission coil 160, 260 or 360. Accordingly, the coupling coefficient between the wireless power transmission apparatus 100, 200, or 300 and the wireless power reception apparatus 30 (see FIG. 1) may be constantly distributed according to the locations of the wireless power transmission apparatus 100, 200, or 300. Accordingly, as the chargeable area of the wireless power transmission apparatus 100, 200, or 300 is enlarged, the power transmission efficiency of the wireless power transmission apparatus 100, 200, or 300 can be improved.

Although embodiments of the disclosure have been described only for the illustrative purpose of the technical concept of the disclosure, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. A wireless power transmission apparatus comprising:
a coil unit including:
a first layer including a first wireless power transmission coil having an asymmetric shape, and
a second layer including a second wireless power transmission coil having an asymmetric shape, the first and second wireless power transmission coils being connected in parallel and partially overlapping with each other; and
first and second terminals configured to simultaneously apply current to the first and second wireless power transmission coils connected in parallel,
wherein the first wireless power transmission coil and the second wireless power transmission coil have line symmetry with respect to an imaginary line extending between the first and second terminals and between the first and second layers,
wherein the first wireless power transmission coil includes a first rounded inner coil part and a second rounded inner coil part disposed on opposite sides of the imaginary line, the second rounded inner coil part of the first wireless power transmission coil being smaller than the first rounded inner coil part of the first wireless power transmission coil,
wherein the second wireless power transmission coil includes a first rounded inner coil part and a second rounded inner coil part disposed on opposite sides of the imaginary line, the second rounded inner coil part of the second wireless power transmission coil being smaller than the first rounded inner coil part of the second wireless power transmission coil, and
wherein the first rounded inner coil part of the first wireless power transmission coil and the first rounded inner coil part of the second wireless power transmission coil are disposed on opposite sides of the imaginary line, or the second rounded inner coil part of the first wireless power transmission coil and the second rounded inner coil part of the second wireless power transmission coil are disposed on opposite sides of the imaginary line.

2. The wireless power transmission apparatus according to claim 1, wherein the first wireless power transmission coil and the second wireless power transmission coil have different shapes.

3. The wireless power transmission apparatus according to claim 2, wherein the imaginary line defining the line symmetry between the first and second wireless power transmission coils is located equidistant between the first and second layers.

4. The wireless power transmission apparatus according to claim 2, wherein the imaginary line defining the line symmetry between the first and second wireless power transmission coils is located equidistant between the first and second terminals.

5. The wireless power transmission apparatus according to claim 2, wherein the imaginary line defining the line symmetry between the first and second wireless power transmission coils is located equidistant between a center point of the first wireless power transmission coil and a center point of the second wireless power transmission coil.

6. The wireless power transmission apparatus according to claim 1, wherein the first and second terminals have line symmetry with respect to the imaginary line.

7. The wireless power transmission apparatus according to claim 1, wherein each of the first and second wireless power transmission coils have multiple bends.

8. The wireless power transmission apparatus according to claim 1, wherein each of the first and second wireless power transmission coils includes at least one 90 degree bend.

9. The wireless power transmission apparatus according to claim 1, wherein the first and second wireless power transmission coils are configured to provide a magnetic field.

10. The wireless power transmission apparatus according to claim 9, wherein the magnetic field is substantially uniform in an area over the coil unit.

11. The wireless power transmission apparatus according to claim 1, wherein the first wireless power transmission coil includes at least one 90 degree bend between the first rounded inner coil part of the first wireless power transmission coil and the second rounded inner coil part of the first wireless power transmission coil.

12. The wireless power transmission apparatus according to claim 1, wherein the second wireless power transmission coil includes at least one 90 degree bend between the first rounded inner coil part of the second wireless power transmission coil and the second rounded inner coil part of the second wireless power transmission coil.

13. The wireless power transmission apparatus according to claim 1, wherein the first wireless power transmission coil includes a diagonal segment relative to the imaginary line, the diagonal segment being disposed between the first rounded inner coil part of the first wireless power transmission coil and the second rounded inner coil part of the first wireless power transmission coil.

14. The wireless power transmission apparatus according to claim 1, wherein the second wireless power transmission coil includes a diagonal segment relative to the imaginary line, the diagonal segment being disposed between the first rounded inner coil part of the second wireless power transmission coil and the second rounded inner coil part of the second wireless power transmission coil.

* * * * *